US008341106B1

(12) United States Patent
Scolnicov et al.

(10) Patent No.: US 8,341,106 B1
(45) Date of Patent: Dec. 25, 2012

(54) SYSTEM AND METHOD FOR IDENTIFYING RELATED EVENTS IN A RESOURCE NETWORK MONITORING SYSTEM

(75) Inventors: Haggai Scolnicov, Tel Aviv (IL); Amitai Armon, Tel Aviv (IL); Chaim Linhart, Petach Tikva (IL); Lilach Bien, Rehovot (IL); Noam Petrank, Jerusalem (IL)

(73) Assignee: TaKaDu Ltd., Yehud (IL)

( * ) Notice: Subject to any disclaimer, the term of this patent is extended or adjusted under 35 U.S.C. 154(b) by 0 days.

(21) Appl. No.: 13/313,261

(22) Filed: Dec. 7, 2011

(51) Int. Cl.
*G06F 17/00* (2006.01)
*G06N 5/02* (2006.01)
(52) U.S. Cl. ............... 706/47; 706/45; 706/46; 706/52; 706/62; 702/50; 702/51
(58) Field of Classification Search ............... None
See application file for complete search history.

(56) References Cited

U.S. PATENT DOCUMENTS

| | | | |
|---|---|---|---|
| 4,361,030 A | | 11/1982 | Heide |
| 4,407,158 A | * | 10/1983 | Petroff ............... 73/196 |
| 4,712,182 A | | 12/1987 | Wakamori et al. |
| 4,796,466 A | | 1/1989 | Farmer |
| 4,797,621 A | | 1/1989 | Anderson et al. |
| 5,301,538 A | | 4/1994 | Recla |
| 5,315,529 A | | 5/1994 | Farmer |
| 5,546,789 A | | 8/1996 | Balke et al. |
| 5,708,195 A | | 1/1998 | Kurisu et al. |
| 5,756,880 A | | 5/1998 | Chen et al. |
| 5,883,815 A | | 3/1999 | Drakulich et al. |
| 6,067,477 A | | 5/2000 | Wewalaarachchi et al. |
| 6,109,096 A | * | 8/2000 | Chen et al. ............ 73/40 |
| 6,336,131 B1 | | 1/2002 | Wolfe |
| 6,477,434 B1 | | 11/2002 | Wewalaarachchi et al. |
| 6,526,358 B1 | | 2/2003 | Mathews, Jr. et al. |
| 6,687,637 B2 | | 2/2004 | Garabedian |

(Continued)

FOREIGN PATENT DOCUMENTS

EP 0821817 6/1999

(Continued)

OTHER PUBLICATIONS

Danilo Mandic, et al. "Data Fusion for Modern Engineering Application: An Overview", ICANN 2005, LNCS 3697, pp. 715-721 (2005).

(Continued)

*Primary Examiner* — Omar Fernandez Rivas
(74) *Attorney, Agent, or Firm* — Seth H. Ostrow; Ostrow Kaufman LLP

(57) ABSTRACT

A computerized method for detecting related events in a water monitoring system. The method includes receiving event data from a plurality of sensors in a water network. The method also includes identifying at least two candidate events from the event data as being candidate events which are likely to constitute part of a common anomaly event, the candidate events each being substantially anomalous. An event combination rule is selected. One or more event characteristics are compared between the at least two candidate events based on the event combination rule. The at least two candidate events are determined whether they are related and associated with a common event causing the at least two candidate events on the basis of the comparison. The determination of the at least two candidate events are related and associated with a common event is reported to a user via a user interface.

30 Claims, 14 Drawing Sheets

U.S. PATENT DOCUMENTS

| | | | |
|---|---|---|---|
| 6,691,724 B2 | 2/2004 | Ford | |
| 6,845,336 B2 | 1/2005 | Kodukula et al. | |
| 6,862,540 B1 | 3/2005 | Welch et al. | |
| 6,963,808 B1 | 11/2005 | Addink et al. | |
| 6,970,808 B2 | 11/2005 | Abhulimen et al. | |
| 6,985,779 B2 | 1/2006 | Hsiung et al. | |
| 6,985,831 B2 | 1/2006 | Ito et al. | |
| 6,993,403 B1 | 1/2006 | Dadebo et al. | |
| 6,995,846 B2 | 2/2006 | Kalayeh et al. | |
| 7,119,698 B2 | 10/2006 | Schleich et al. | |
| 7,135,956 B2 | 11/2006 | Bartone et al. | |
| 7,228,726 B2 | 6/2007 | Kates | |
| 7,233,843 B2 | 6/2007 | Budhraja et al. | |
| 7,233,876 B2 | 6/2007 | Halstead et al. | |
| 7,263,459 B2 | 8/2007 | Ito et al. | |
| 7,283,913 B2 | 10/2007 | Garnaes | |
| 7,310,590 B1 | 12/2007 | Bansal | |
| 7,330,796 B2 | 2/2008 | Addink et al. | |
| 7,412,876 B2 | 8/2008 | Kates | |
| 7,424,399 B2 * | 9/2008 | Kahn et al. | 702/188 |
| 7,437,267 B2 | 10/2008 | Oka et al. | |
| 7,504,964 B2 | 3/2009 | Brennan et al. | |
| 7,523,016 B1 | 4/2009 | Surdulescu et al. | |
| 7,526,944 B2 | 5/2009 | Sabata et al. | |
| 7,529,644 B2 | 5/2009 | Lenz et al. | |
| 7,536,371 B2 | 5/2009 | Hartman et al. | |
| 7,558,703 B2 | 7/2009 | Stouopis et al. | |
| 7,558,771 B2 | 7/2009 | Barajas et al. | |
| 7,587,481 B1 | 9/2009 | Osburn, III | |
| 7,647,136 B2 | 1/2010 | McDowell | |
| 7,669,461 B2 | 3/2010 | Kates | |
| 7,670,494 B2 | 3/2010 | Frank | |
| 7,680,611 B2 | 3/2010 | Guidi et al. | |
| 7,698,073 B2 | 4/2010 | Wolfe | |
| 7,720,615 B2 | 5/2010 | Kim | |
| 7,739,004 B2 | 6/2010 | Johnson | |
| 7,793,188 B2 | 9/2010 | Mukhopadhtat et al. | |
| 7,920,983 B1 * | 4/2011 | Peleg et al. | 702/100 |
| 2002/0116282 A1 | 8/2002 | Martin et al. | |
| 2003/0101009 A1 | 5/2003 | Seem | |
| 2005/0190074 A1 | 9/2005 | Cumeralto et al. | |
| 2005/0246112 A1 | 11/2005 | Abhulimen et al. | |
| 2006/0179463 A1 | 8/2006 | Chisholm et al. | |
| 2007/0016399 A1 | 1/2007 | Gao et al. | |
| 2007/0083398 A1 | 4/2007 | Ivey et al. | |
| 2007/0203860 A1 | 8/2007 | Golden et al. | |
| 2007/0219728 A1 | 9/2007 | Papageorgiou et al. | |
| 2007/0233397 A1 * | 10/2007 | Kim | 702/19 |
| 2007/0247331 A1 | 10/2007 | Angelis et al. | |
| 2007/0288200 A1 * | 12/2007 | Guidi et al. | 702/179 |
| 2008/0109175 A1 | 5/2008 | Michalak | |
| 2008/0168339 A1 | 7/2008 | Hudson et al. | |
| 2008/0250497 A1 | 10/2008 | Mullarkey et al. | |
| 2009/0299660 A1 * | 12/2009 | Winter | 702/51 |
| 2010/0169477 A1 | 7/2010 | Stienhans et al. | |
| 2011/0215945 A1 * | 9/2011 | Peleg et al. | 340/870.02 |

FOREIGN PATENT DOCUMENTS

| | | |
|---|---|---|
| EP | 1047925 | 3/2004 |
| EP | 0925491 | 5/2004 |
| EP | 1324165 | 11/2007 |
| EP | 1867970 | 12/2007 |
| EP | 1133690 | 11/2008 |
| EP | 2060896 | 5/2009 |
| KR | 1020080005694 | 1/2008 |
| TW | 439028 | 6/2001 |
| TW | 200713114 | 4/2007 |
| WO | 0020832 | 4/2000 |
| WO | 01/95277 | 12/2001 |
| WO | 0194937 | 12/2001 |
| WO | 0245315 | 6/2002 |
| WO | 02086670 | 10/2002 |
| WO | 2004113863 | 12/2004 |
| WO | 2005094493 | 10/2005 |
| WO | 2007002838 | 1/2007 |
| WO | 2008016697 | 2/2008 |
| WO | 2008029681 | 3/2008 |
| WO | 2008067442 | 6/2008 |
| WO | 2008094551 | 8/2008 |
| WO | 2009055342 | 4/2009 |
| WO | 2010035281 | 4/2010 |

OTHER PUBLICATIONS

Sholom M. Weiss and Nitin Indurkhya. Predictive Data Mining: A Practical Guide. Morgan Kaufmann, 1997, p. 147.

ABB Group (2009) "Solutions for the Water Cycle Leakage Management", ABB Water Industrial Sector Initiative, 26 slides (pages); state retrieved from http://www.abb.com/industries/db0003db004063/a0a4683761017bb2c12574bb002be3b5.aspx.

Stephen Mounce, et al. (2006) "Burst Detection Using Hydraulic Data From Water Distribution Systems With Artificial Neural Networks", Urban Water Journal, 12 pages, UK.

Dalius Misiunas (2005) "Failure Monitoring and Asset Condition Assessment in Water Supply Systems", Doctoral Dissertation in Industrial Automation Department of Industrial Electrical Engineering an Automation, Lund University, Sweden, 349 pages.

Centre for Water Systems: A Leading Center for Water Engineering Research in the UK. vol. II, Issue 2, Autumn 2009 <http://centres.exeter.ac.uk/cws/downloads/doc_download/53-cws-newsletter-volume-2-issue-2>.

Frenk Withoos, et al. (2004) "Leak Manager, Analysis and Management of Water Leakage in Potable Water Distribution Networks Using Advise IT Water Leakage Management", ABB Review, Innovative Engineering, pp. 61-63; state retrieved from http://www.abb.com/industries/db0003db004063/a0a4683761017bb2c12574bb002be3b5.aspx.

Ivan Stoianov, et al. (2007) Pipenet: A Wireless Sensor Network for Pipeline Monitoring, in IPSN07: 264-273. ACM, 2007, USA, 10 pages.

Gabrys, B. and Bargiela, A. "Simulation of Water Distribution Systems". In: The European Simulations Symposium (ESS'98), Oct. 26-28, 1998, Nottingham, UK, pp. 273-277.

Mamlock, R. and Al-Jayyousi, O. "Fuzzy Sets Analysis for Leak Detection in Infrastructure Systems: A Proposed Methodology". In: Clean Technology Environmental Policy 6, pp. 26-31, 2003.

* cited by examiner

SYSTEM AND METHOD FOR IDENTIFYING RELATED EVENTS IN A RESOURCE NETWORK MONITORING SYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATIONS

The present application is related to:

U.S. patent application Ser. No. 12/717,944, entitled "SYSTEM AND METHOD FOR MONITORING RESOURCES IN A WATER UTILITY NETWORK," filed on Mar. 5, 2010, now issued as U.S. Pat. No. 7,920,983; and U.S. patent application Ser. No. 13/008,819, entitled "SYSTEM AND METHOD FOR IDENTIFYING LIKELY GEOGRAPHICAL LOCATIONS OF ANOMALIES IN A WATER UTILITY NETWORK," filed on Jan. 18, 2011;

the disclosures of which are hereby incorporated by reference in their entirety.

FIELD OF THE INVENTION

The invention described herein generally relates to systems for monitoring resources such as water in a resource distribution or collection system and, more particularly, for identifying related events in a water utility network and correlating the related events to a single event or cause.

BACKGROUND OF THE INVENTION

Monitoring systems are designed to identify anomalous features in data received from multiple sources and to characterize and report such anomalies as events occurring on the system being monitored. Monitoring systems often report on many different events at once, based on anomalies occurring in the monitored system at around the same time, same location, or the like. Some of these events, though reported separately, may actually be caused by or otherwise related to the same real-world events, though such information is not provided by or clear from the event data being reported.

For example, in a water network monitoring system, multiple neighboring sensors may register the same event as simultaneous increases or decreases in flow or other quantities in multiple locations. The correct classification of certain anomalous events depends heavily on their multiple effects, which are likely to be detected separately. For example, a breached unmonitored valve between two District Metered Areas (DMAs) typically manifests itself as a simultaneous flow increase in one and corresponding flow decrease in the other, both of which would be detected and reported as events, though as separate events.

Moreover, for a sufficiently small event, individual component anomalies may be statistically insignificant, if viewed separately, but stand out if correctly considered together. However, this requires examining many "not quite significant" anomalies in order to find within them a few significant sets of related anomalies, each of which sets may be the effects of a single significant event in the real world.

Thus, in current network monitoring systems, especially in those used to monitor water utilities, existing methods do not adequately account for different sources or items of event data corresponding to a single network event, leading to misclassification, reduced detection sensitivity and increased workload for users. In addition, the amount of event data increases as additional sensors are added to a network for greater accuracy, or sampling frequencies are increased for more up to date results, thus exacerbating this problem by increasing the number of duplicate events being detected in the network. Therefore there is a need to improve existing event monitoring and detection systems to identify anomalies or events which are related.

SUMMARY OF THE INVENTION

The present invention provides a computerized method and system for identifying events by correlating multiple instances of anomaly data detected in a monitoring system as being related to one another and caused by or attributable to a common underlying cause or event. In some embodiments the monitoring system is used for monitoring a resource distribution, delivery or collection system such as a water utility network, oil or gas pipeline network, sewage system, or computer data, cable, satellite or other digital content delivery network. The method includes receiving and storing anomaly or event data derived or generated from data received from one or more sources including meter data generated by a plurality of sensors in the water network. Each item of anomaly or event data comprises data identifying the anomaly or event and one or more characteristics such as the type, magnitude, start time, duration, or impact of the event. Commonly owned U.S. Pat. No. 7,920,983, entitled "SYSTEM AND METHOD FOR MONITORING RESOURCES IN A WATER UTILITY NETWORK" which is herein incorporated by reference in its entirety, describes various systems and methods for detecting anomalous data in a water utility network.

According to some embodiments, the method involves identifying at least two such items of anomaly or event data as candidate events, that is, events that are candidates for being part of a combined or composite event. One way such identification is performed is by examining sensor and other data for periods of anomalous data, compared to some learned or assumed statistical behavior. A probability of the anomalous data being randomly occurring (not caused by an event of interest) may also be determined. The method according to some embodiments may further include determining related locations corresponding to the anomalous data.

Candidate events may include anomalies not individually significant enough to be reported as anomalous, but which may help detect a significant anomaly when merged with other candidate events (also possibly of low individual significance). The combination of candidate events may serve not only to identify relations between anomalies and to detect events with less significant signals, but also to better classify and measure events. For example, a flow increase and a nearby flow decrease may be combined to identify a breached valve event. Even if the individual flow changes were large enough to be detected as statistically significant, without the context of the composite event they might not be correctly classified as describing a breached valve.

The method includes identifying at least two candidate events from the event data as being part of a composite event. According to some embodiments, several schemes or "combination rules" are processed to combine candidate events into composite events. Each such combination rule employs particular algorithms and parameters and creates composite events of particular types of classes. For example, a particular rule may combine candidate events which describe flow increases into a composite event of type "leak."

A combination rule determines how many candidate events may be combined (e.g., exactly 2, 2 or more, etc.), and which candidate events to consider (e.g., only flow increase events, all pressure events, events shorter than 1 day in duration, etc.). For events identified as being candidate events, one or more event characteristics of the event data representing such events are compared with the corresponding event characteristics of any or all other candidate events as determined by the combination rule. Based at least in part on these comparisons, at least two candidate events are determined to be related to one another and associated with a common event causing the at least two candidate events. The at least two candidate events are merged into the single composite event, with composite event data determined by the combination rule (e.g., selecting the earliest start date of a candidate event, the average magnitude, etc.), and added to a pool or database of events from which they may be reported along with other, "regular" events. Through this subsequent merging of events, events which are selected as candidate events but not statistically significant enough to report in and of themselves, can still be later processed into composite events. Also, false positives in the candidate selection stage are unlikely to randomly survive later stages of the combination rule comparison.

In some embodiments, determining the at least two candidate events are related and associated with a common event may comprise determining the at least two candidate events having related location. The combination rule determines which locations are related, e.g. identical or adjacent sub-zones of a water network.

According to some embodiments, determining the at least two candidate events are related and associated with a common event may comprise determining the at least two candidate events having near start times. In some embodiments, where start time is not provided as a part of candidate event data, the combination rule sets tests and parameters used to determine start time. Determining a start time of the at least two candidate events may involve determining a time which creates distinct separation between a sensor's data before the start time and the sensor's data after the start time, such as a large separation between averages of the sensor's data values before the start time and the sensor's data values after the start time, in comparison to their variances. The combination rule specifies how to determine that two or more start times are near, for example by requiring the difference between start times to be shorter than a predetermined period.

In some embodiments, determining the at least two candidate events are related and associated with a common event comprises determining the at least two candidate events having a permitted set of anomaly directions, where the sum or combination of the permitted set of anomaly directions matches an expected net direction of the at least two candidate events for them to be related. The combination rule determines which sets of anomaly directions are permitted. Matching anomaly directions may include the at least two candidate events being associated with measurement increases, the at least two candidate events being associated with measurement decreases, or one of exactly two candidate events associated with a measurement increase and the other associated with a measurement decrease.

Similarly, in some embodiments, determining the at least two candidate events are related and associated with a common event may comprise determining the at least two candidate events having a permitted set of anomaly magnitudes, where the sum or combination of the permitted set of anomaly magnitudes matches an expected net magnitude of the at least two candidate events for them to be related. Matching anomaly magnitudes may, for example, include the at least two candidate events associated with measurement increases of a same (or similar) magnitude, the at least two candidate events associated with measurement decreases of a same magnitude, or measurement increases and decreases of the at least two candidates which sum together to zero (or close to zero), such as one increase of X and one decrease of approximately X.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which are shown by way of illustration, exemplary embodiments in which the invention may be practiced. It is to be understood that other embodiments may be utilized and structural changes may be made without departing from the scope of the present invention.

Figure 1:
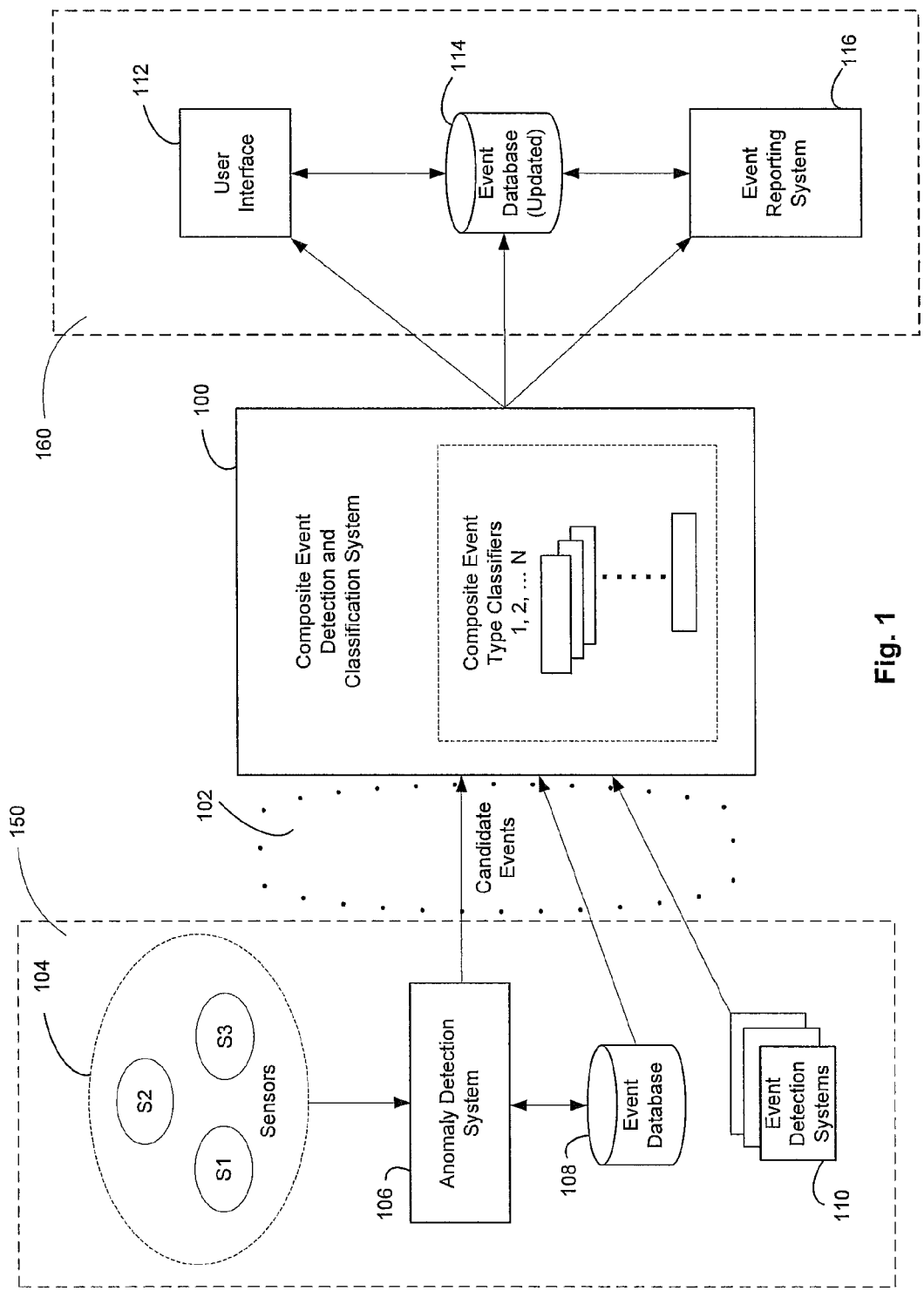
FIG. 1 presents an illustration depicting a system for monitoring a water network according to an embodiment of the present invention.

FIG. 1 presents a block diagram illustrating one embodiment of a water network monitoring system in a water distribution system. As shown in FIG. 1, the system includes composite event detection and classification system 100, input sources 150, and output destinations 160. Input sources 150 include candidate events 102, sensors 104, anomaly detection system 106, event database 108, and event detection systems 110. Output sources 160 include user interface 112, updated event database 114, and event reporting system 116. One of skill in the art will appreciate that systems 100, 106 and 110 are composed of software systems residing and operating on computer hardware devices, and that elements 100-116 may be contained in or reside on the same computerized device, or distributed among multiple devices connected via a computer network.

In addition, one of skill in the art will recognize that other water network monitoring systems may be used within the context of the invention which detect and report on events generated due to anomalous data received from sensors on the network; events detected by these systems will be processed as candidate events.

Water distribution systems are one or more connected water distribution systems, or water distribution systems located in different areas with few or no connections between them. In one embodiment, the water distribution system may be any suitable resource distribution network, such as a municipal, rural, or wholesaler water utility network, liquid distribution network in a factory or other large building, or naval vessel, fuel distribution network, or any suitable resource collection network such as a sewer system. One of skill in the art will appreciate that the water distribution system may be any resource distribution or collection system.

Sensors 104 include sensor S1, S2, and S3. The sensors send time-dependent data representative of operational parameters of the network, such as water flow, pressure, turbidity, reservoir level, chlorine level, and pH level, as raw data to anomaly detection system 106. For example, the network may obtain this information by using a Supervisory Control and Data Acquisition (SCADA) system. Data from sensors 104 may report data from specific meters/sensors, or collections of meters/sensors, some of which may be related. For example, sensors may be grouped geographically by zone or by District Metered Area (DMA), as one skilled in the art will appreciate.

Based on the raw data, anomaly detection system 106 reports candidate events to composite event detection and classification system 100. Data generated in anomaly detection system 106 may also be stored in event database 108. Anomaly detection system 106 may also analyze data stored in event database 108 over a period of time to determine candidate events based on combination rules, which are described in further detail below. In an alternative embodiment, data from anomaly detection system 106 may be aggregated in event database 108 and sent to composite event detection and classification system as a batch of candidate events. In yet another embodiment, sensors 104 may include advanced sensors with event detection functionality that are capable of producing data suitable to be provided as candidate events 102 directly to composite event detection and classification system 100. The present invention allows for data to be received as candidate events 102 directly from the sensors in the network, anomaly detection system 106, event database 108, or event detection systems 110. Data received as candidate events 102 may additionally be enriched by a data preparation engine (not illustrated) to, for example, add or calculate new types of data such as an average magnitude of the event.

For convenience, the term "sensor data" will be used in this specification to refer generally to data from a single sensor, a predefined meaningful combination of readings from multiple sensors, or multiple readings from one or more sensors received over time, such as the total sum ingoing flow to a DMA, or any similar predefined calculation generating a meaningful set of time-dependent data describing some aspect of the network. Event database 108 and event detection systems 110 may include asset management information, which may be any information in a digital format that can be correlated with sensor readings to determine or refute an anomaly. For example, this may include information concerning water network operations, such as routine or planned water network operations, opening and closing of valves that affect water flow, acoustic surveys, repairs or improvements made to any part of the water network, dates and times of the repairs/improvements, locations of the repairs/improvements, routine maintenance made to the network, and access control information indicating when and where on the network technical personnel may be active. Additionally, event database 108 and event detection systems 110 may include additional information relevant to water consumption and network conditions, such as weather reports, holidays or other calendar events that affect water consumption and network behavior within given portions of the network, or any other event by the utility itself or its customers that may impact the function of the water network. The storage and usage of this type of secondary data in the event database 108 is further described in commonly owned U.S. Pat. No. 7,920,983.

Anomaly detectors 106 include anomaly detectors for testing the likelihood of no anomaly for sensors and for testing the likelihood of alternative hypotheses such as specific event types. Anomaly detectors 106 send anomalies as candidate events 102 to composite event detection and classification system 100. Some of those anomalies represent events in and of themselves, and some represent parts of events such as the start of an event, the end of an event, substantial change in an event, peak of an event, and the like. Anomaly detectors 106 are operative to analyze the significance of any deviations of the expected value sent from predictions of and the actual value retrieved from a distribution network. For each data set, each anomaly detector determines, by analyzing the significance of deviations, the statistical likelihood that no relevant anomaly occurred given the sensor readings during a given time period. The anomaly detectors 106 analyze the significance of deviations over time, e.g., over minutes, hours, days or longer, since, for example, the continued or frequent occurrence of the deviations raise the significance of such deviations. As one of ordinary skill in the art will recognize, a system designer would design or adjust the anomaly detectors 106 to analyze deviations over a time period based on, among other things, the sensitivity desired for small time scale events, recently started events, which are usually detectable when they have large magnitudes, as opposed to small magnitude events which require sustained deviations over a longer time period for detection. The function and operation of anomaly detectors which may be used in the present system are further described in commonly owned U.S. Pat. No. 7,920,983.

In one embodiment, an anomaly detector finds an anomaly when there exists a consistent statistically large deviation from expected values over a given period. In this context, statistically large generally refers to a statistically significant relative bound, such as N standard deviations, above the X percentile, or K times the inter-quartile range, or other standardizations which take into account the actual distribution of the data, depending on particular implementations. Furthermore, when comparing momentary readings to the expected values, using the overall standard deviation or other statistical descriptor of differences from expected values can produce a high number of false positives, because the comparison may, for example, mix together high-variance times of day with low-variance times of day. Therefore, to reduce this error, in some embodiments the system compares a reading X(t) to the predicted value P(t) by dividing X(t)−P(t) into, for example, the standard deviation of such differences at that approximate time of day, on that day of the week. The magnitude of the relative bound and the length of the period are parameters of the method, which enable particular instantiations to focus alternatively on shorter or on smaller events. In another embodiment, an anomaly detector computes the area under the curve (AUC) of the difference between actual and predicted values over particular fixed periods or, alternatively, of the absolute value of that difference—this affects whether or not low values may cancel out with subsequent high values.

In some embodiments, candidate events may be aggregated at system 100 from the anomaly detection system 106, event database 108 and event detections systems 110. Data received as candidate events may be organized and formatted to be further processed. Additionally, data may be prepared for analysis by removing data not reflecting the actual performance of the network or reflecting a transient phenomenon that system designers or network managers have decided not to address; methods commonly known in the art may be applied to "smooth" the data collected from the network. Anomaly detection system 106 is further operative to perform statistical analysis of data from sensors 104 to determine the overall statistical likelihood of the "no anomaly" hypothesis, given recent sensor readings.

A pool of candidate events 102—each generally detected independently of the others—is examined to determine the existence of subsets of closely related events. The composite event detection and classification system 100 may detect a composite event with greater statistical significance than each of the multiple anomalies which lead to its detection, from the same or different sensors and at the same time or over a given time period, that all consistently indicate the occurrence of the event. For example, one anomaly may represent the start of an event and another anomaly may represent a change in the event or the end of the event, and the classification system 100 recognizes those anomalies as being related to a single event. As another example, two anomalies from different sensors related to increased flow, in a similar time and from related locations, would both indicate the same event. One of skill in the art will recognize that the appearance of at least two sufficiently similar data anomalies may be significantly less likely to be a random event than the appearance of equally anomalous, but dissimilar candidate events. In an exemplary embodiment, candidate events may be generated from anomalies rated by anomaly detection system 106 as having a 10% probability of not being an anomaly; composite events detected based on pairs of such events may have just a 1% probability of not being anomalous. Composite event detection may thus greatly decrease the "false positive" rate, while preserving a high rate of detection.

The classification system 100 may also include composite event type classifiers to classify and combine candidate events having a high probability of being related. Composite event type classifiers may include combination rules used to determine whether a set of candidate events are related and may be combined to form composite events of a given event type. Each combination rule may cause events combined under that rule to be classified as a specific event type, such as breach valve, leak, burst, etc. Each candidate event or a combination of two or more events may be classified into events or anomalies, based on a fingerprint or signature characterizing the events and anomalies. The signature of a candidate event or set of candidate events may be compared with a signature of a known anomaly type to determine whether the candidate event is an anomaly of that type. This signature or fingerprint may be apparent only when two or more candidate events are taken together, for example two or more candidate events of identical or similar magnitude or trend.

Specific combination rules may detect, among others:
a simultaneous flow increase and flow decrease in two adjacent DMAs or sub-networks, indicating a breached unmonitored boundary valve (DMA boundary breach);
a flow increase and one or more turbidity increases downstream of it;
a reservoir level decrease and a turbidity increase at the reservoir's exit, indicating that the reservoir should be cleaned;
a turbidity increase and a close chlorine decrease, indicating a probable biological water quality problem;
zero pressure in several neighboring sensors, indicating that water was shut off (rather than a single zeroed sensor, possibly indicating a sensor failure);
several (similar) pressure decreases in a supply zone;
several similar transmission failure events in the same area, probably indicating a single transmission problem (and better reported as a single event);
a flow increase and one or more pressure decreases, indicating a leak; and
a flow increase followed by a similar flow decrease, indicating a leak and its repair.

Examples of events detected by the analysis engine are a water leak, a burst, a faulty sensor, a water theft, a communication fault, a water quality issue, an unexpected increase in consumption, a change in consumption pattern, network malfunctions such as abnormal reservoir levels or pressures, and others. Further detail regarding events may be included such as the start time of the event, the end time of the event, a magnitude of the event, a total water loss associated with the event, by way of example.

Classification engine 100 also generates additional data regarding each candidate event, such as start time, end time, magnitude of the event, an accumulated magnitude of the event such as the total water lost since the leak began, type, status, and physical units of the event, such as pressure units, pH, or chlorine concentration. Magnitude of the event is, in some embodiments, a value representing the size or proportion of the event, such as a calculation of extra flow over normal conditions, sensor miscalculation, or chlorine change. This information may be stored in event database 108 to be further stored in updated event database 114. Certain outputs of anomalies are mapped to certain fields of events stored in database 108.

Database 114 receives information from composite event detection and classification system 100 and may also be retrieved by user interface 112 and event reporting system 116. In another embodiment, user interface 112 and event reporting system may receive information from composite event detection and classification system 100 directly. Event reporting system 116 may be a system that interfaces with another software program used by the operators of the water distribution system. For example, the event data may be sent to a workflow system or asset management system so that the event may be more readily acted upon. Database 114 or classification system 100 may host an interactive software application such as the user interface 112 that associates meter data, alerts, reports, statistical analysis and a map of the water network with a user interface to allow a user of the system to easily discern the characteristics, such as location, of a water leak or other event, and to inspect how and why a composite event was detected, and based on which candidate events.

In one embodiment, user interface 112 and event reporting system 116 may be a web page viewable to a user over a network or the internet. The user interface 112 may include update status informing the user of the last date and time that the system monitored the water network for anomalies. Also, an events list panel may provide the user with a listing of previously detected events, the dates, times, locations, and status of the events. In another embodiment, the events list panel may further allow the person viewing the user interface 112 to select an event in the events list panel. Detailed information associated with the selected event is reproduced as event information, graphs, and maps. Event information includes, for example, a start time of the anomaly, an end time of the anomaly, a magnitude of the anomaly, a total water loss associated with the anomaly, and any comments supplied by users of the system. Graphs may include detailed information about the user-selected event such as a visual comparison of the actual and predicted (routine) flow of water at a relevant meter. In one embodiment, the user-selected event may be associated with a specific meter, and the location of the meter is produced on an event map, or an event map may be enabled to display an area of the network affected by the detected event, or an estimated area within which the exact event location is statistically likely to be contained. The user interface may enable access to events reported by systems other than composite event detection and classification system 100, providing the user with a single, convenient interface. Examples of user interface screens generated by such a system are included in commonly owned U.S. Pat. No. 7,920,983.

Elements 100-116 may be accessed and/or implemented on a device that may comprise a desktop personal computer, workstation, terminal, laptop, personal digital assistant (PDA), cell phone, or any computing device capable of connecting to a network. The device may also comprise a graphical user interface (GUI) or a browser application provided on a display (e.g., monitor screen, LCD or LED display, projector, etc.). Data transmitted between elements 100-116 may be accomplished by means of a network. The network may be any suitable type of network allowing transport of data communications across thereof. In one embodiment, the network may be the Internet, following known Internet protocols for data communication, or any other communication network, e.g., any local area network (LAN), or wide area network (WAN) connection.

Figure 2A:
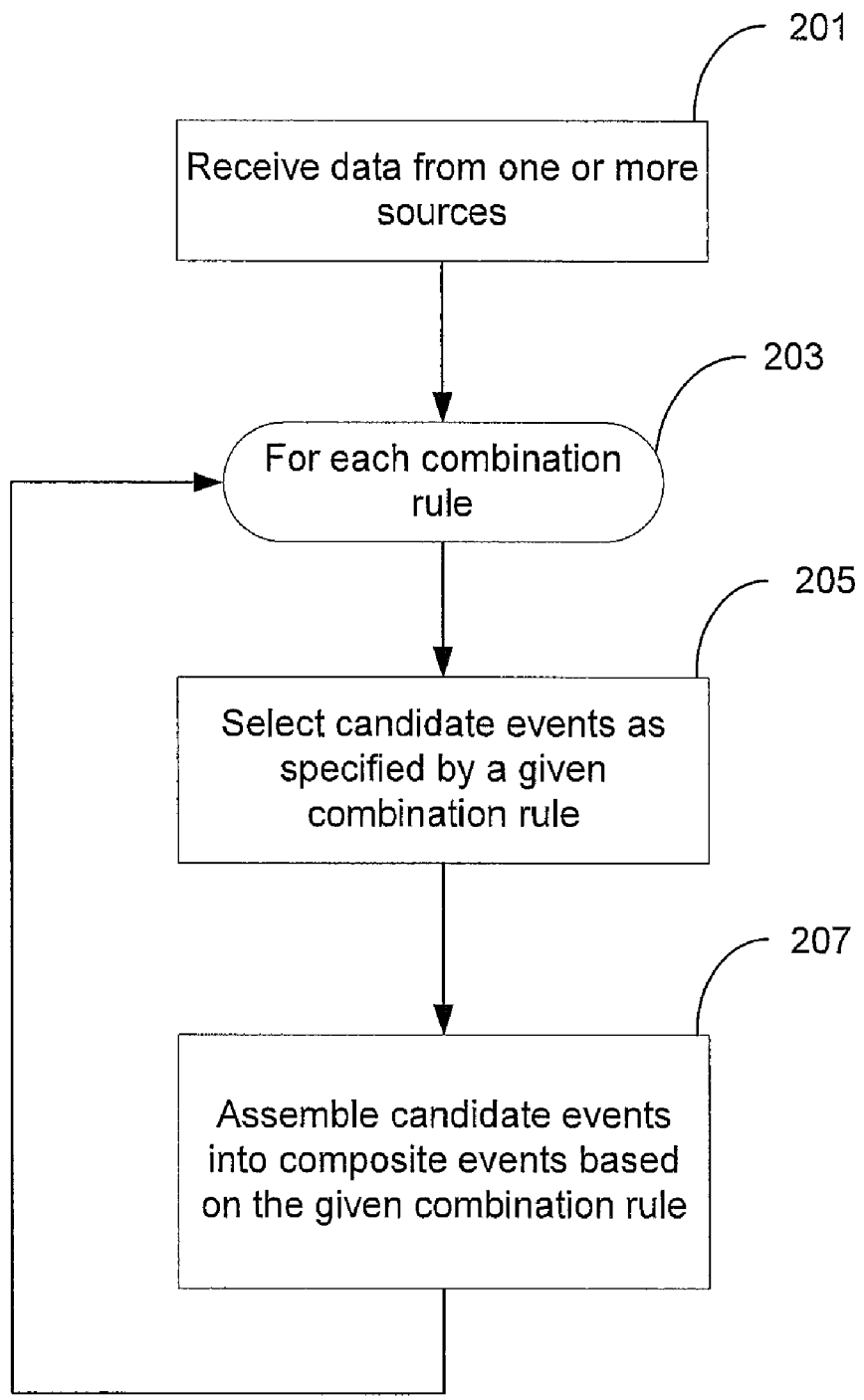
FIGS. 2A, 2B, and 2C present flow diagrams illustrating methods for identifying a candidate event according to an embodiment of the present invention.

FIG. 2A presents a flow diagram illustrating a method for determining composite events from candidate events according to an embodiment of the present invention.

Data from the input sources 150 may be received by a composite event detection and classification system such as the one illustrated in FIG. 1. The data may be used to generate candidate events by running an anomaly detector for different event types according to specific combination rules. For each of the different types of events are different combination rules including algorithms, tests and parameters associated in selecting, combining and categorizing candidate events. In step 201, data is received from one or more sources. The sources may be from sensors, anomaly detection systems, event databases, and event detection systems. The data is received by a system, such as the composite event detection and classification system of the present invention, from these input sources where the data may be identified as a pool of candidate events. The system includes composite event type classifiers that examine candidate events for each combination rule associated with the event type classifiers, step 203.

One or more rules and parameters for processing the candidate events are selected based on a given composite event type. Some of those candidate events may represent events in and of themselves, and some may represent parts of events such as the start of an event, the end of an event, substantial change in an event, peak of an event, and the like. Examples of events types may include a water leak, a burst, an unexplained flow increase or decrease, an unexplained pressure increase or decrease, a faulty sensor, a water theft, a communication fault, a water quality issue, an unexpected increase in consumption, a change in consumption pattern, network malfunctions such as abnormal reservoir levels or pressures, and others. In a next step 205, candidate events are selected as specified by a given combination rule. Two or more candidate events may be selected from the pool of candidate events according to criteria and parameters set by the given combination rule. The selected candidate events are assembled into composite events based on the given combination rule, step 207. Composite events may include a set of candidate events that, when combined, may be viewed as a single event. Upon assembling the candidate events into composite events, the process repeats and returns to step 203 to analyze using additional combination rules.

Figure 2B:
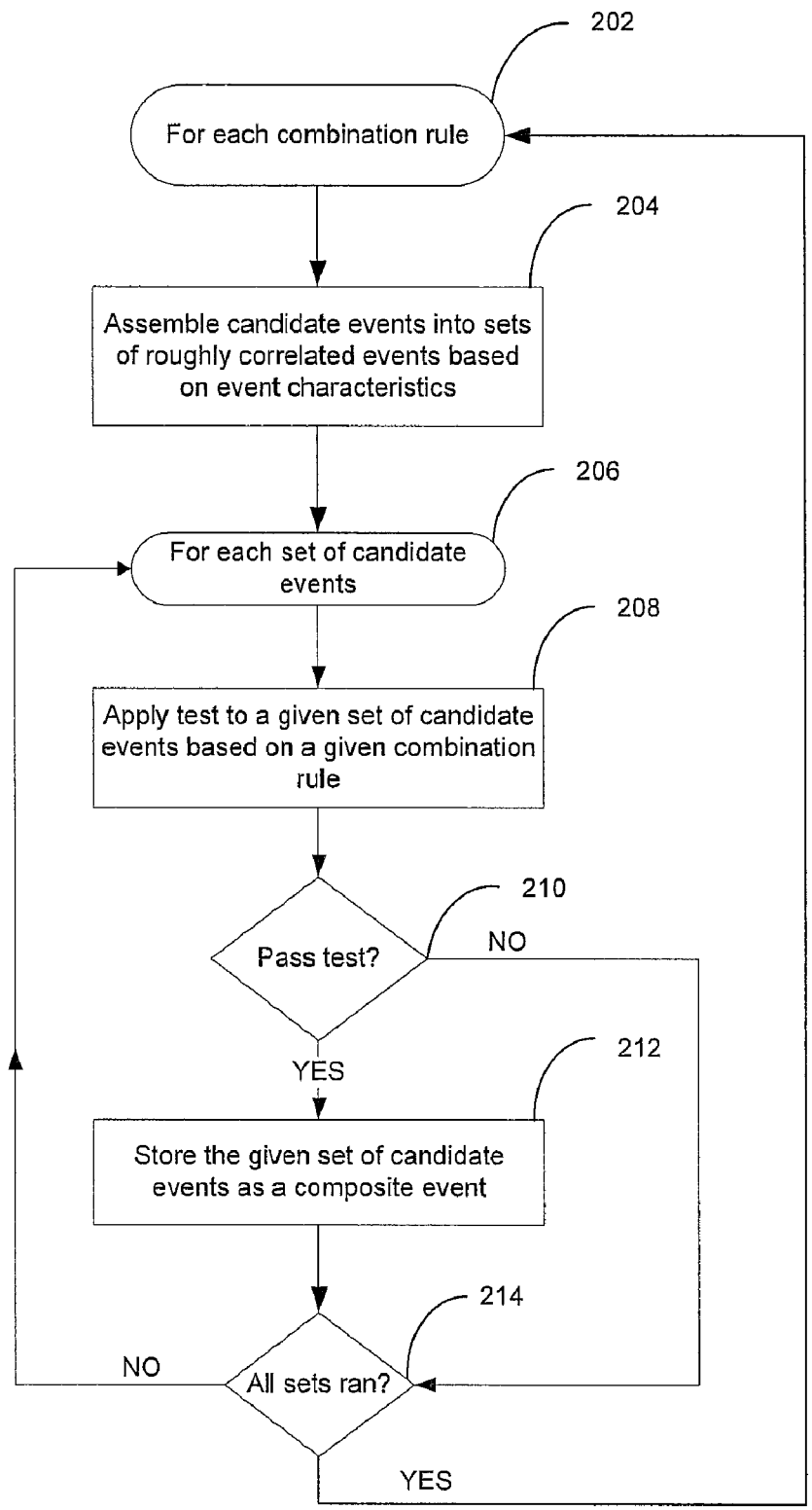

FIG. 2B presents another flow diagram illustrating a method for determining composite events from candidate events according to an embodiment of the present invention. Composite event type classifiers examine candidate events for each combination rule associated with the composite event type classifiers, step 202. Each combination rule may be a set of rules, tests, or parameters for detecting whether sets of candidate events, that when combined may form a single type of event. Candidate events are received from the input sources of candidate events described above and may be placed into a pool of candidate events for analysis. The candidate events may be low significance anomalies or abnormalities that are low in magnitude. These candidate events may be observed over a given time period to determine whether they are events. Each candidate event may be tagged or selected based on certain criteria from the combination rules.

In step 204, candidate events are assembled into sets of two or more roughly correlated candidate events with event characteristics matching some criteria, as determined by a given combination rule being used. For example, the rule may be to select all possible pairs of candidate events, or it may be to select all sets of up to 5 candidate events with identical or neighboring locations. In one embodiment, such characteristic comparison of the candidate events may be performed and the events may be grouped into clusters according to clustering methods such as those well-known in the art. Other assembling or grouping criteria in various combination rules may also consider, for example, temporal proximity, related flow magnitudes and directions, start times, and other detectable characteristics. Generally, this rough correlation stage uses computationally undemanding methods to restrict attention to just some of the subsets of candidate events, to make the subsequent use of more computation-intensive tests to identify truly correlated events more feasible.

Each set of candidate events is analyzed in iterations, step 206. In each iteration, one or more tests are applied to a given set of candidate events based on a given combination rule selected, step 208. The applied tests may be unique for each combination rule selected for the set of candidate events. A determination is made whether the set of candidate events passes the tests of the given combination rule, step 210. The set of candidate events may be merged together upon determining that the set of candidate events pass the tests and corresponds to a composite event based on the given combination rule. If the set of candidate events does not pass the test, the method proceeds to determine whether all of the sets of candidate events have been run, step 214. When all of the sets of candidate events have run, the method returns to step 202 to run another combination rule. Otherwise, if all the sets have not been run, the method returns to step 206 to test the remaining sets of candidate events.

The composite event may include a set of candidate events classified as a specific type of event when combined as a whole. Combination of the set of candidate events may produce different types of events such as a pressure drop, breached valve, etc. The given set of candidate events is stored as a composite event in step 212. The composite event may be further processed and analyzed in the same fashion as a single "regular" event. If the set of candidate events do not pass the tests or a certain amount of tests set by the combination rule, the set of candidate events may be discarded and the candidate events are returned to the pool of candidate events for possible selection for other sets of candidate events. A determination is made whether all the sets of candidate events have been ran, step 214. The method returns to step 202 if all of the sets have been ran, otherwise, the method proceeds to step 206.

Figure 2C:
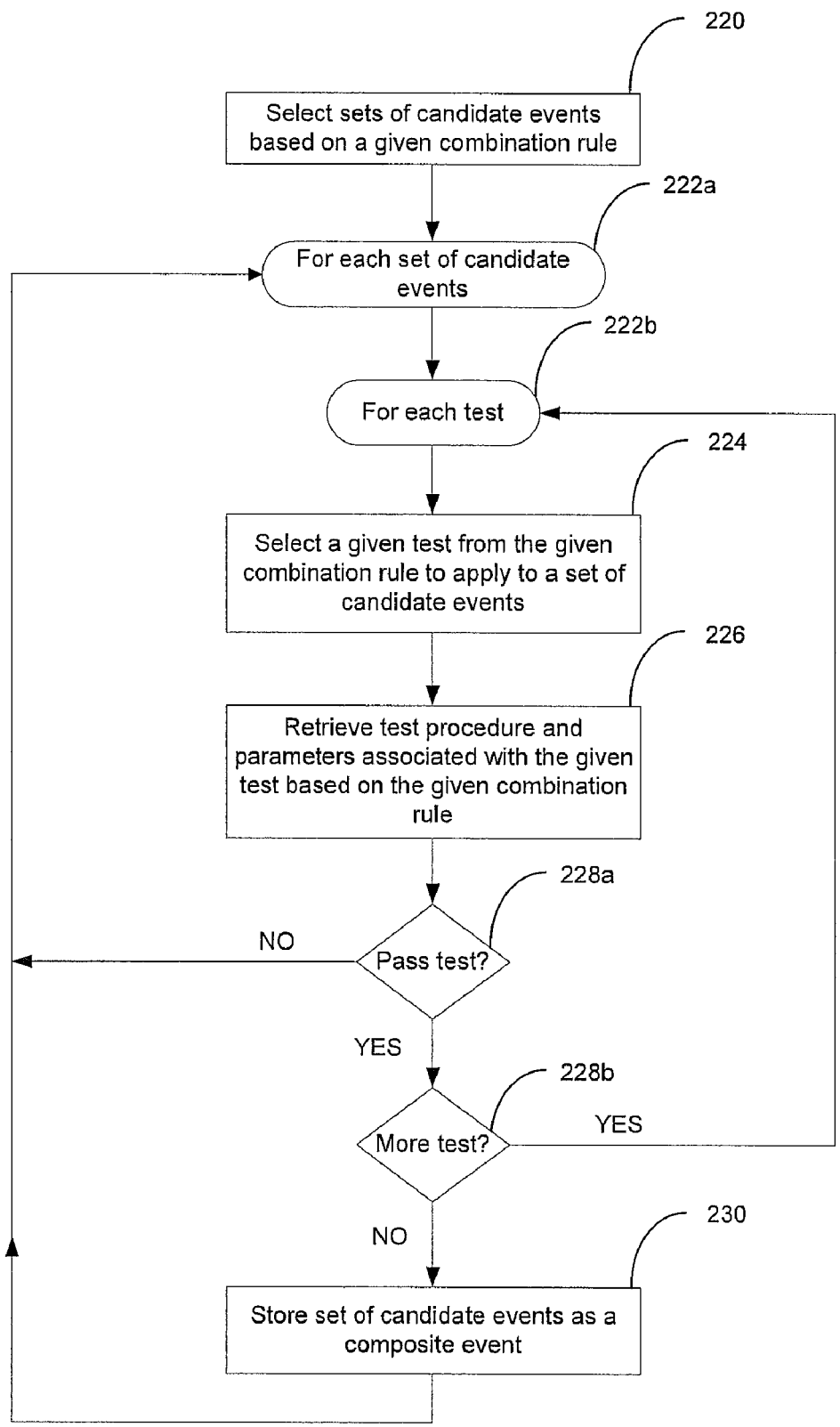

FIG. 2C presents yet another flow diagram illustrating a method for determining composite events from candidate events according to an embodiment of the present invention.

As described above, candidate events may be received into a pool of candidate events by a composite event detection and classification system. From the pool of candidate events, a selection of candidate events is made based on a given combination rule, where they may be correlated and assembled into sets of candidate events. The sets of candidate events are selected based on the given combination rule for analysis, step 220. Specific sets of candidate events may be selected based on certain criteria associated with an event type being searched for using the combination rule.

Each set of candidate events is analyzed according to the given combination rule, step 222a. For each test, step 222b of a given set of candidate events, a given test from the given combination rule is selected to apply to the given set of candidate events, step 224. The test may include determining geographical proximity, temporal proximity, magnitudes, etc., based on the given combination rule. A test procedure and parameters associated with the given test are retrieved based on the given combination rule, step 226. Each combination may be associated with a different event type with different test procedures and parameters for detecting such event types. A determination is made whether the candidate set passed the test, step 228a. If the set of candidate events does not pass the test, the candidate set is rejected and the method returns to step 222a to analyze another set of candidate events with the combination rule. Otherwise, a determination is made whether there are more tests from the given combination rule, step 228b. If there are additional tests, the method returns to step 222b to select another test. When all of the tests for the given combination rule have been exhausted, the set of candidate events is first stored as a composite event, step 230 before returning to step 222a to analyze additional sets of candidate events.

Figure 3:
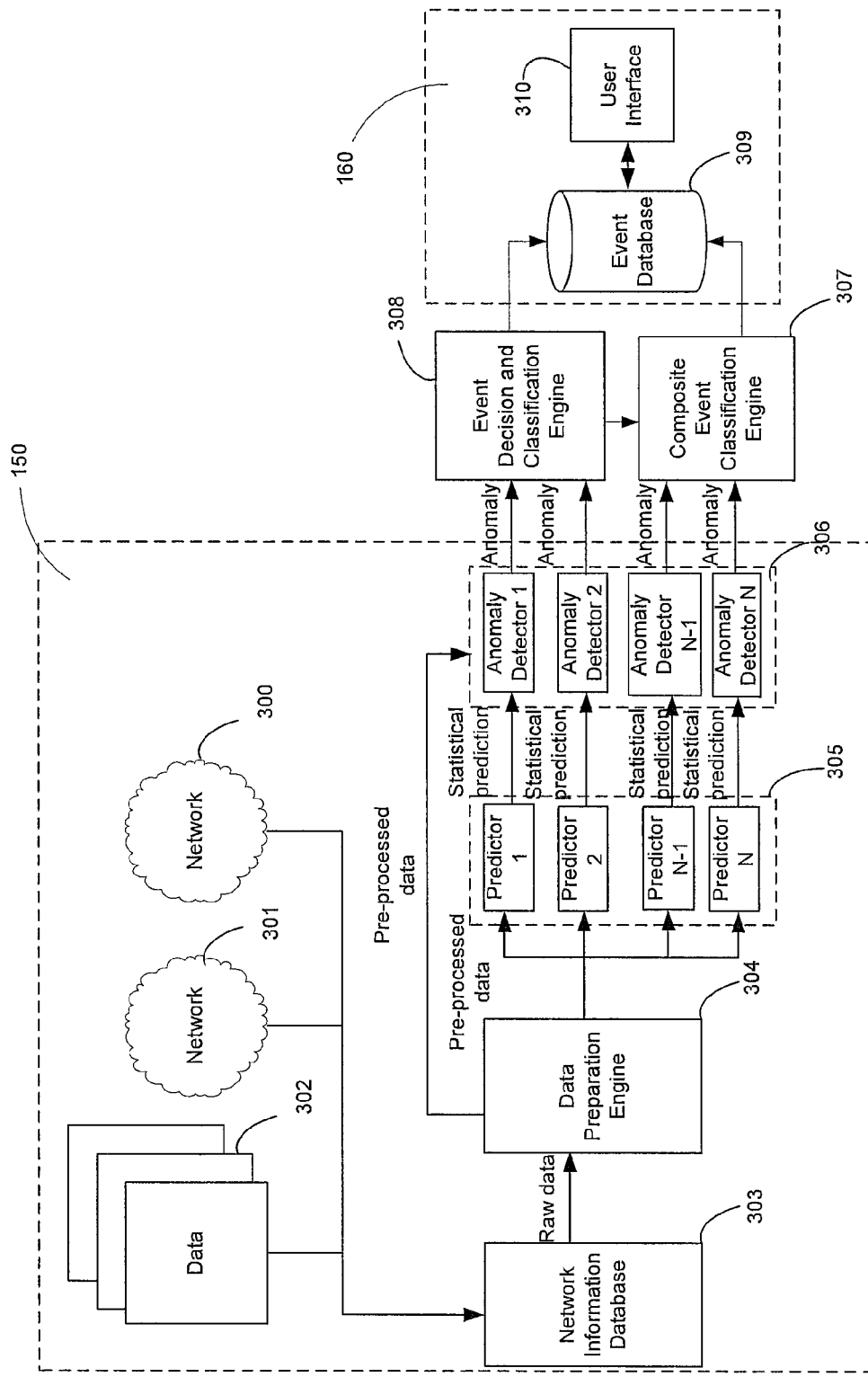
FIG. 3 presents an illustration depicting a system for monitoring a water network according to another embodiment of the present invention.

FIG. 3 presents a block diagram depicting further details of a water network monitoring system according to certain embodiments. FIG. 3 includes water network 300, water network 301, data 302, network information database 303, data preparation engine 304, predictors 305, anomaly detectors 306, composite event classification engine 307, event decision and classification engine 308, event database 309, and user interface 310. Water network 300, water network 301, data 302, network information database 303, data preparation engine 304, predictors 305, and anomaly detectors 306 may be a further embodiment of input 150, while event database 309 and user interface 310 may be an alternative embodiment of output 160.

Water distribution systems, represented by elements 300 and 301, may be one or more connected water distribution systems, or water distribution systems located in different areas with few or no connections between them. In one embodiment, elements 300 and 301 may be any suitable resource distribution network, such as a municipal, rural, or wholesaler water utility network, gas distribution network, liquid distribution network in a factory or other large building, or naval vessel, or any suitable resource collection network such as a sewer system. One of skill in the art will appreciate that elements 300 and 301 may be any water distribution or collection system. Water network 300 and water network 301 send time-dependent data representative of the network, such as water flow, pressure, turbidity, reservoir level, chlorine level, and pH level.

Data from water network 300 or water network 301 may report data from specific meters, or collections of meters, some of which may be related. For example, meters may be grouped geographically by zone or by DMAs, as one skilled in the art will appreciate. The data may be sent directly from the meters or collections of meters in the network, or the data may come from a network information database 303. Additionally, the data could be enriched by data preparation engine 304 to, for example, add or calculate new types of data such as morning and evening average flow data, or total flow into a zone or DMA (through several meters). For convenience, the term "meter data" will be used in this specification to refer to the actual data from a single meter, or a predefined meaningful combination of readings from multiple meters or of multiple readings from one or more meters received over time, such as the total sum ingoing flow to a DMA, or any similar predefined calculation generating a meaningful set of time-dependent data describing some aspect of the network. One skilled in the art will readily identify such meaningful combinations, based on the network layout and the locations of individual meters.

Data 302 represents other data including asset management information, which may be any information in a digital format that can be correlated with meter readings to determine or refute an anomaly. For example, this may include information concerning water network operations, such as routine or planned water network operations, opening and closing of valves that affect water flow, acoustic surveys, repairs or improvements made to any part of the water network, dates and times of the repairs/improvements, locations of the repairs/improvements, routine maintenance made to the network, and access control information indicating when and where on the network technical personnel may be active. Additionally, data 302 includes additional information relevant to water consumption and network conditions, such as weather reports, holidays or other calendar events that affect water consumption and network behavior within given portions of the network, or any other event by the utility itself or its customers that may impact the function of the water network.

Network information database 303 aggregates the raw data collected from the meters in water networks 300 and 301, and Data 302. Data from network information database 303 is sent to data preparation engine 304. Data preparation engine 304 organizes and formats received data to be further processed. As known to those of skill in the art, data formats used by different water distribution systems may differ from one another. For example, the city of London may collect and store network data in a format completely different than New York City. Additionally, data preparation engine 304 prepares data for analysis by removing data not reflecting the actual performance of the network or reflecting a transient phenomenon that system designers or network managers have decided not to address; methods commonly known in the art may be applied to "smooth" the data collected from the network. Some of these methods are Locally Weighted Scatterplot Smoothing (LOWESS) and heuristic cleaning as applied to the specific data being received from a given water network.

Data preparation engine 304 extracts the data elements from the network data and formats them into a consistent format. Among filtered information may be noise associated with the data transmissions from aspects of the resource, such as for example noisy data transmission from a meter, or errors associated with the data measurements, transmissions or collection. Data preparation engine 304 may also output all data received from water networks 300 and 301, after it has been formatted but with less or no filtering or smoothing, to allow the system to analyze data that could otherwise be discarded if one of the smoothing techniques is first applied. Data preparation engine 304 sends pre-processed data to predictors 305 and anomaly detectors 306. One of skill in the art will appreciate that elements 303-310 may be contained in or reside on the same device, or distributed among multiple devices.

In one embodiment, predictors 305 contain N number of individual predictors using various techniques. The predictors 305 analyze sets of data and provide predictions of statistical distributions of the expected actual meter values assuming no anomalous events are occurring. As commonly known in the art, predictors may be designed using a machine learning framework to statistically analyze the data. Examples of the machine learning framework are discussed in Ethem Alpaydm, Introduction to Machine Learning (Adaptive Computation and Machine Learning), MIT Press (2004), ISBN 0262012111; Ryszard S. Michalski, Jaime G. Carbonell, Tom M. Mitchell, Machine Learning: An Artificial Intelligence Approach, Tioga Publishing Company (1983), ISBN 0-935382-05-4 hereby incorporated by reference in their entirety.

Anomaly detectors 306, which may include N number of individual detectors, receive statistical prediction data from predictors 305 and pre-processed data from data preparation engine 304. Anomaly detectors 306 may send anomalies to either event decision and classification engine 308 or composite event classification engine 307. Engine 308 may typically output events each based on a single anomaly, while engine 307 will typically output events each based on two or more anomalies. Both engine 307 and 308 are operative to compare a statistical analysis from the N anomaly detectors 306 to determine the overall statistical likelihood of the no-anomaly hypothesis given recent meter readings. However, certain types of anomaly events may pass through event decision and classification engine 308 before being received by composite event classification engine for the purposes of formatting the data received from anomaly detectors 306. Information or data from engine 307 and 308 is stored in database 309 to be further sent to user interfaces 310. Certain outputs of anomalies are mapped to certain fields of events stored in Database 309. Database 309 receives information from engines 307 and 308 for storage in database 309 and for retrieval from database 309 by user interface 310.

Figure 4:
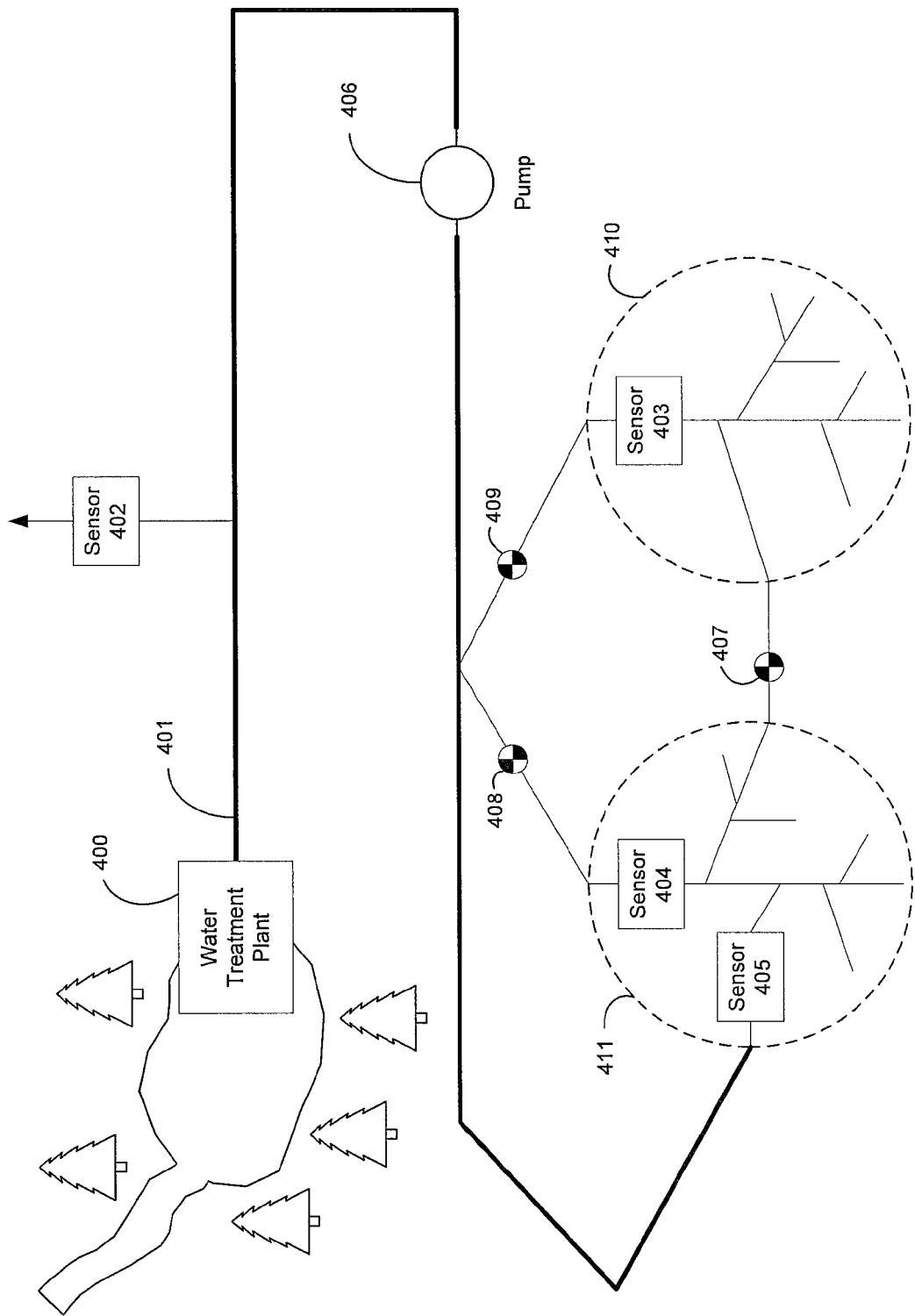
FIGS. 4 and 5 present illustrations depicting water distribution systems where methods according to an embodiment of the present invention may be employed.

FIG. 4 depicts a block diagram a water distribution system according to an embodiment of the present invention. The system of FIG. 4 includes water facility 400, water main 401, sensor 402, 403, 404, 405, pump 406, valve 407, 408, 409, and DMAs 410 and 411. The diagram is illustrative of a pipe network for distribution of water to the consumers, which may be to private houses or industrial, commercial or institution establishments, and other points such as fire hydrants.

Water facility 400 may be a water collection point where water accumulates, such as a lake, a river, or groundwater from an underground aquifer. The water collected at water facility 400 may be treated or processed and transferred using water main 401 to distribute the water for consumption. Water main 401 may be a primary underground pipe in the water distribution system including a plurality of pipes for conveying water from a water supply. In alternative embodiments, water main 401 may also correspond to uncovered ground-level aqueducts and covered tunnels. The water main 401 may be tapped by secondary water pipes to expand the reach of the water distribution system. These secondary water pipes may have sensors 402-405 installed to measure various water-related attributes. Sensors 402-405 may measure water flow rate, pressure, flow direction and other measurements that may be taken on the pipes. Additionally, sensors may also be installed on water main 401 to monitor attributes of the water flowing through water main 401 (not illustrated).

Water travels through the sensors and continues to where it may be further distributed to regions or points. Areas where the water main 401 branches off into the secondary water pipes may be DMAs or Flow-Monitored Zones (FMZ). A DMA represents an area of a distribution system which is specifically defined, e.g., by the closure of valves, and in which the quantities of water entering and leaving the district are metered. As known to one of skill in the art, an analysis of flow, particularly of the night flow, is often used to estimate the level of leakage within the district. This is to determine not only whether work should be undertaken to reduce leakage, but also to compare levels of leakage in the different districts to assess where it is most beneficial to undertake leak location activities.

Additional water pressurizing components such as pump 406 may be situated at an intermediate point within water main 401, as illustrated, raise water pressure so as to transport water and meet the demands of the water distribution system. Valves 408 and 409 may exist at boundaries of a DMA where a sub-network of pipes may provide water to a region, possibly with additional valves within the DMA (not illustrated). Secondary pipes may be interconnected and form sub-networks to provide water to an entire region. One or more of the valves may be opened to allow water flow from water main 401 to pipes routed to DMAs 410 and 411 through sensors 403 and 404. As illustrated, DMA 401 may be interconnected with DMA 411 by a pipe connected to valve 407. By definition, any pipe connecting two DMAs should either include a monitored flow meter, or should have a (closed) valve as illustrated by valve 407. Valve 407 is typically closed but may be opened for maintenance, repairs, or emergencies. Such a configuration allows for redundancy and a pipe to be repaired while still being able to provide water to an affected region, albeit at the cost of decreased ability to monitor the network; however, under normal operating conditions, the DMAs are effectively disconnected.

In one example, valve 407 may be a "breached valve" allowing water to flow through its corresponding pipes, where under normal circumstances, valve 407 should be closed. A first event may be detected upon a decrease in the sum of flows measured by sensor 404 and sensor 405. For a given event that occurs in a network system, there are often times at least one other event related to the given event. The breach in valve 407 may cause both this decrease and an increase in flow rate to sensor 403 (because of the unmonitored flow through valve 407). The two flow rate change events may be identified as related and part of a composite "breached valve" event. Event pairs are described for simplicity but may be expanded to larger sets. Methods for identifying related events will be described in further detail below with respect to the description of FIG. 6-12.

Figure 5:
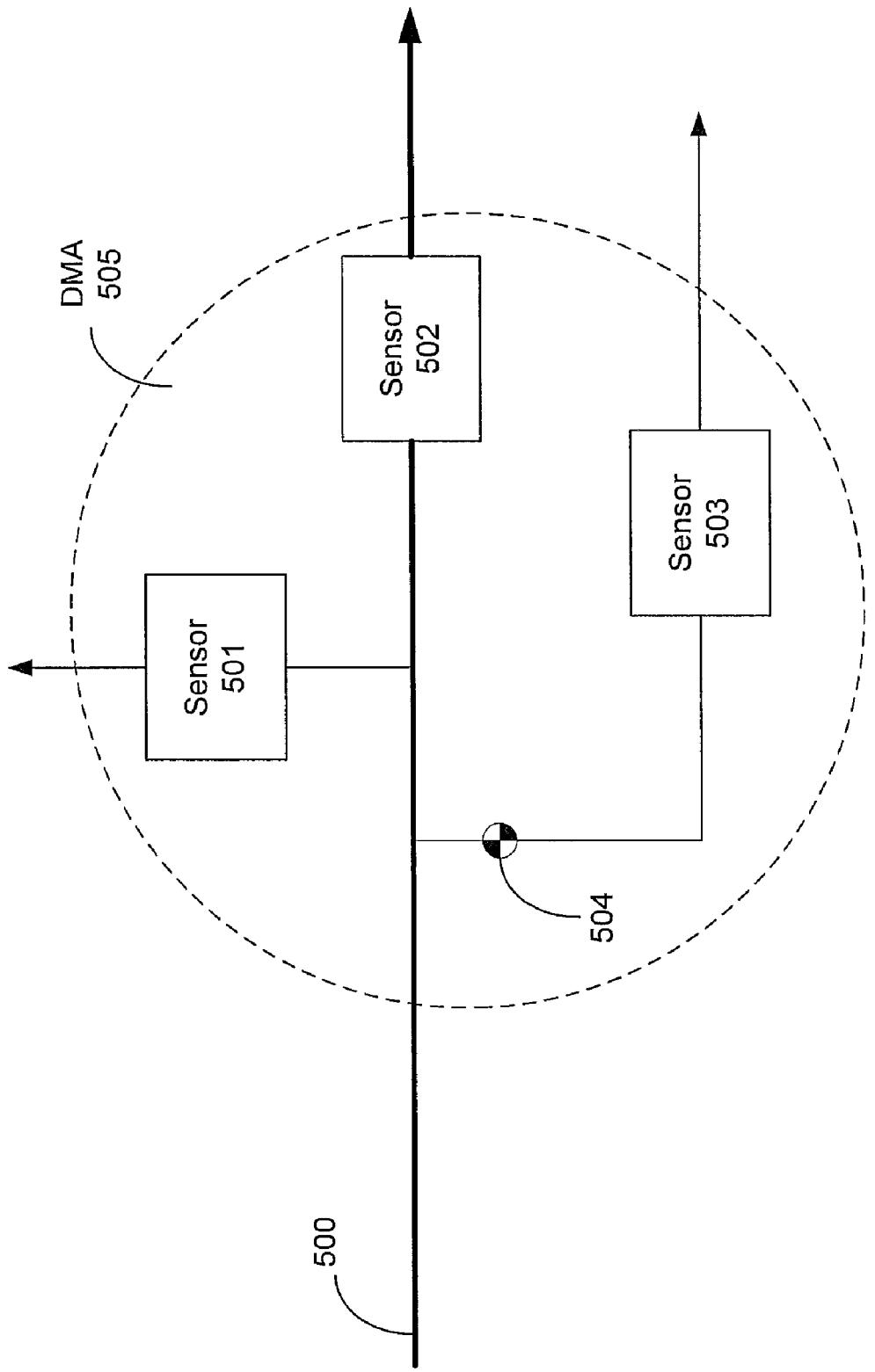

FIG. 5 presents a block diagram of a segment of a water distribution system according to an embodiment of the present invention. The water distribution system includes water main 500, sensor 501, 502, 503, and valve 504. The diagram is illustrative of a portion of a pipe network for distribution of water to consumers. Sensor 501, 502, 503, and valve 504 are illustrated as being within the boundaries of DMA 505. DMA 505 represents a sub-network of pipes or sensors grouped within a given geographical region. Water main 500 represents a primary pipe in the system of pipes for conveying water from a water supply. A sensor 502 may also be installed on water main 500 to monitor or measure attributes associated with the water flowing through water main 500. Water main 500 serves as a primary supply pipe and may be tapped by secondary water pipes, such as the pipes leading to sensors 501 and 503. These secondary water pipes form sub-networks which may be characterized as DMAs and provide for monitored water distribution to regions associated with the DMAs. The data collected by sensors 501-503 may be used to identify anomalies.

A single real-world event detected on a monitored system, such as a water distribution network, is often associated with one or more related anomalies, which may be detected and reported independently, depending on the limitations of the anomaly detection methods employed, and indeed may all be required in order to assure detection of the underlying event. However, a user is typically interested in the root cause and real events in the system, not in duplicate or "ghost" events which are artifacts or intermediate stages of the monitoring process. These related events or anomalies may be a chain of events caused by or causing other anomaly events in the network. For example, valve 504 may be initially closed, allowing water only to flow through the pipes connected to sensor 501 and 502 from water main 500. Opening valve 504 may cause water to be distributed to an additional pipe leading to sensor 503, which causes for example an increase in flow to be detected. A pressure increase may also be monitored in sensor 503. Meanwhile, sensor 502 may detect that a measurable attribute of the water flowing through water main 500 is considerably lower than normal (e.g., water pressure drop) at the location associated with sensor 502. Sensor 501 may also detect that measurements taken at the location associated with sensor 501 is different from normal.

These measurements may be compared with data measured by the sensors prior to an event over a given duration, such as a day. A monitoring system of the water distribution system may detect these anomalies and make a correlation between the anomalies on the basis of their likely physical or logical location, size, direction, time or times of occurrence, or other measurements and characteristics of the anomaly events, which will be described in further detail below with respect to the description of FIGS. 7-12. In one embodiment, the sensor events may be further correlated to an event detected at sensor 503, corresponding to a large deviation in data measured by sensor 503 resulting from the opening of valve 504.

Events occurring upstream on water main 500 (on the left-hand side of FIG. 5), such as at valve 504, usually affect pipes connected to sensors 501 and 502. Conversely, events occurring downstream (on the right-hand side of FIG. 5), such as at pipes connected to sensors 501 and 502, may also propagate to an upstream section of the water main 500. Rules depend on event/data type on which direction propagation of signal is likely. For example, some hydraulic effects may propagate upstream and downstream, whereas some water quality effects may propagate downstream only. In another embodiment, a "path" of anomalies may be established where anomalies detected in the path may all be determined to be related to a single event or cause, e.g. when a water quality event propagates gradually with the flow of a contaminant through the pipes.

The monitoring system may traverse a path of continuous anomalies until reaching a sensor with normal measurements. In another example, the monitoring system may detect a sudden "surge" of water flowing through the pipe at a location associated with sensor 503 upon opening valve 504. The event detected at sensor 503 may be correlated to the anomalies at sensors 501 and 502 based on the time at which the events detected by the sensors occurred. It may be determined that the start time at which the event at sensor 503 occurred coincides exactly or closely enough with the start times of the events at sensors 501 and 502. Hence, it may be determined that the events detected by sensor 501, 502 and 503 are associated with and/or caused by a common event. Each combination rule determines criteria for determining related anomalies or events, based on specific degrees of proximity or relations between anomaly or event characteristics, such as directions, magnitudes, and start times.

The following steps described with respect to FIGS. 6-12 may be performed, in one embodiment, by the system of FIG. 1 or FIG. 3, or alternatively by any other monitoring systems capable of monitoring resource distribution networks. The following figures describe combination rules where the system of the present invention may iterate through in generating composite events. The system may generate candidate events by running an anomaly detector at, for example, fairly high sensitivity, and select a set of candidate events based on a rough correlation based on the events' characteristics. The set of candidate events are further tested based on, for example, geographical proximity, temporal proximity, and a "fingerprint" or matching set of anomaly magnitudes. The details of performing each such test which may be used are described below, but one of ordinary skill in the art may substitute the following with other methods as necessary in the same or similar template of a combination rule.

Figure 6:
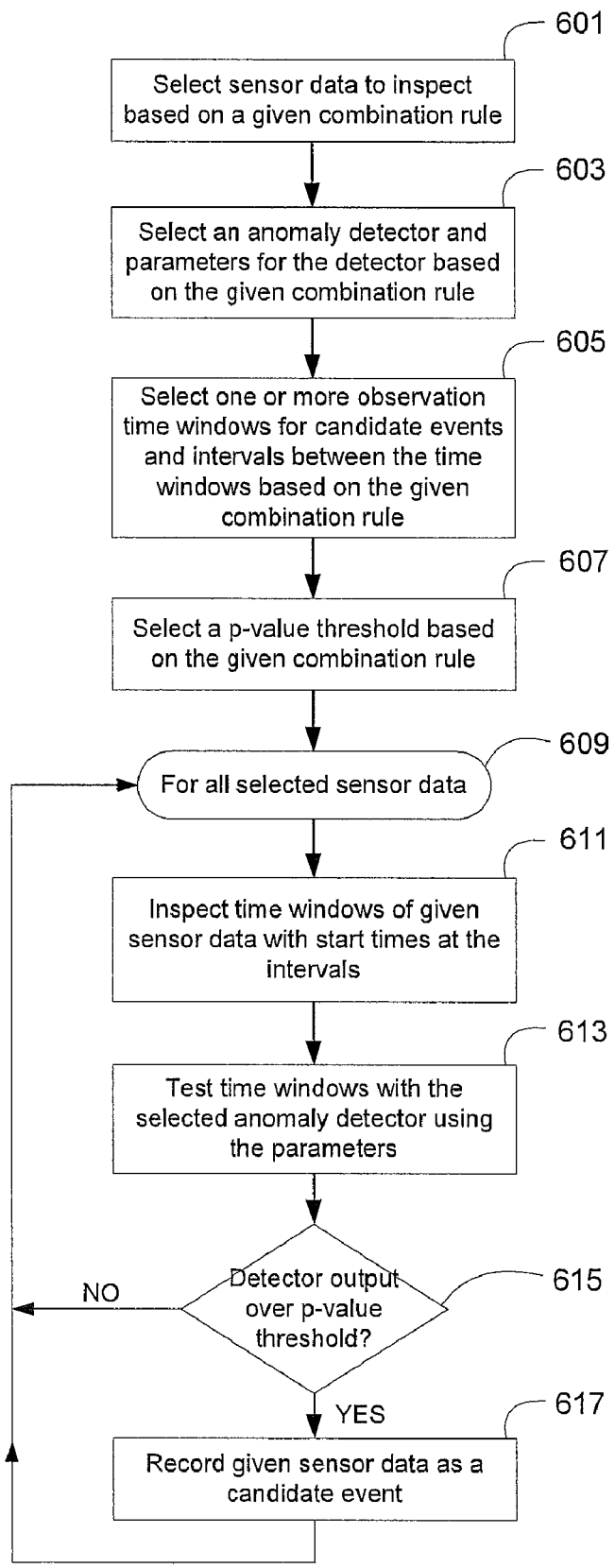
FIG. 6 presents a flow diagram illustrating method for identifying a candidate event according to an embodiment of the present invention.

FIG. 6 presents a flow diagram illustrating a method for identifying a candidate event according to an embodiment of the present invention. In step 601, sensor data is selected for inspection based on a given combination rule. Next in step 603, the system selects an anomaly detector and parameters for the detector based on the given combination rule. The monitoring system may include anomaly detectors set to a relatively low statistical threshold for examining events occurring over relatively long periods of time. One or more observation time windows for candidate events and intervals between the time windows are selected based on the given combination rule, step 605.

In step 607, a p-value threshold is selected based on the given combination rule. All of the selected sensor data are iterated through for analyzing, step 609. In a given iteration, time windows of a given sensor data are inspected with start times at the intervals, step 611. For example, if the window is one day and the interval is half a day, then one day windows are examined starting every midnight or noon. In a water distribution network, in which events may last for days and transient effects or maintenance work that may last for hours, an observation period (time window) may be set to one day. In the exemplary embodiment, the observation period may be set to days, although one of ordinary skill may appreciate that the monitoring system may be set to identify any period of time with variable p-values. Candidate events may have one or more pre-defined p-value threshold values, time windows, and a skip value (interval) for how much to move of shift the time windows for testing against a threshold, depending on the event type of the candidate events.

As described above, predictors may analyze sets of data and provide predictions of statistical distributions of the expected actual sensor values assuming no anomalous events are occurring. Anomaly detectors may test for the likelihood of no anomalies for the sensor and the likelihood of alternative hypotheses such as specific event types. The monitoring system may use the anomaly detectors to search for anomalous periods of time (e.g., days) for each sensor, identifying days for which that sensor's data has for example, a p-value of 0.1 or less (i.e., indicates this sensor data is only 10% likely to be a false-positive, or not an anomaly event)). Thus, for example, a small deviation that only occurs once or for a short period of time such as a minute would not be detected as an anomaly, while the same small deviation occurring over an extended time period or frequently within that period would be identified as statistically significant by the anomaly detectors. An exemplary p-value of 0.1 reduces the number of irrelevant or randomly-appearing candidate days and reduces the number of irrelevant pairs which must be examined. The p-value may be set to a higher value to reduce the amount of computational work but may decrease the likelihood of detecting actual anomalies. Because the next stage, selection of sets of candidates with a "rough correlation", is unlikely to "unfairly" preserve false positives, a relatively sensitive threshold may be used. In the above example, allowing 10% of the sensor-days through as candidate events may seem like a high proportion (considering that real anomalies are likely to be rarer than that), but for example for a particular pair of sensor-days to be output as a false positive, that proportion becomes 10%×10%=1%.

In some embodiments, the sensor data used may be a processed version of the original sensor data received, and may be further restricted in time from the entire historical data. For example, the data sets used for the above analysis may be the average sensor values calculated over consecutive 6-hour periods (one average value for each sensor for every 6 hours). Analyzing the significance of deviations, for example, a sensor reading, when compared to the historical statistical data, may be significant in light of the historical statistical data. For each data set, each anomaly detector determines, by analyzing the significance of deviations, the statistical likelihood that no relevant anomaly occurred given the sensor readings during a given time period. Anomaly detectors analyze the significance of deviations over time, e.g., over minutes, hours, days or longer, since, for example, the continued or frequent occurrence of the deviations raise the significance of such deviations. The system considers normalized values that best describe the anomaly type or types as detected by the anomaly detection methods of the anomaly detectors.

Regarding analyzing the significance of deviations, for example, a sensor reading, when compared to the historical statistical data, may be significant in light of the historical statistical data. For example, a difference of three standard deviations or a value in the top percentile may be a significant deviation. In other embodiments, the statistical deviation is measured by the historically observed distribution of deviations as a function of parameters. One such parameter may be the time of day, meaning that the significance of the deviation may depend on the distribution of deviations which may vary according to time of day. Other such parameters may include weather measurements such as temperature or humidity, weather warnings, holidays, or sporting events that may change network characteristics on that day or time of day. Analyzing deviations in sensor readings may also consider information concerning water network operations, such as routine or planned water network operations, opening and closing of valves that affect water flow, acoustic surveys, repairs or improvements made to any part of the water network, dates and times of the repairs/improvements, locations of the repairs/improvements, routine maintenance made to the network, and access control information indicating when and where on the network technical personnel may be active.

Anomalies which pass a certain significance threshold may be identified as candidate events. Now referring to FIG. 6, in step 613, the system tests the time windows for the sensor data with the selected anomaly detector using the parameters. A determination is made of whether output from the anomaly detector is below the selected p-value threshold, step 615. If the output is not below the p-value threshold, the system returns and examines another sensor data, step 609. However, if the output of the anomaly detector is below the p-value threshold, the process proceeds to step 617 where the given sensor data is recorded as a candidate event. The recorded candidate event may be added to a list or pool of candidate events. The list of candidate events may be provided to other components within the monitoring system for further processing such as an event classification system. Methods for determining whether candidate events, determined for example by the method of FIG. 6, constitute parts of a composite event are described in detail below with respect to the description of FIG. 7-12.

Figure 7:
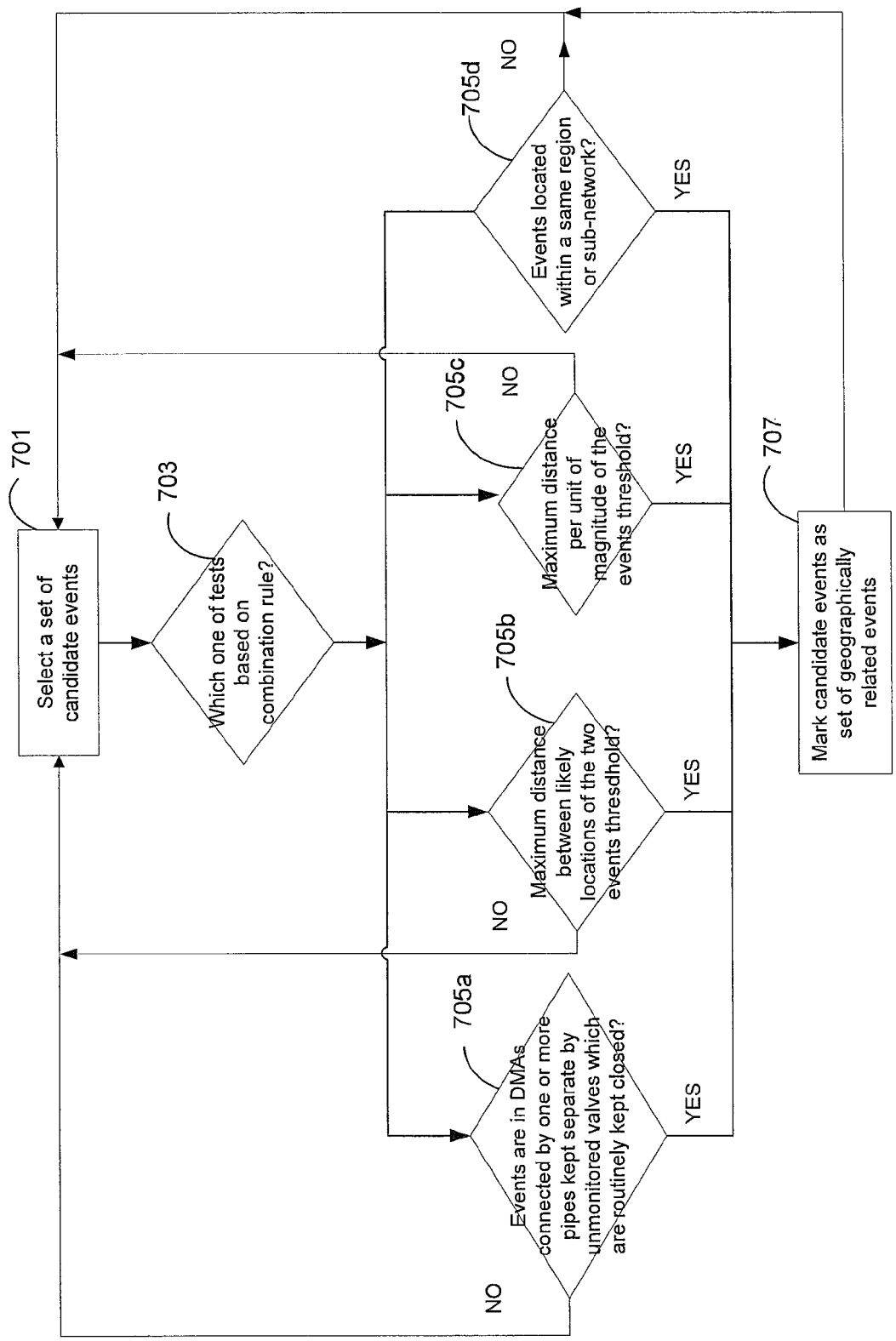
FIG. 7 presents a flow diagram illustrating a variety of tests, any one of which may be used for identifying event pairs with related locations according to an embodiment of the present invention.

FIG. 7 presents a flow diagram illustrating a method for identifying event pairs with related locations according to an embodiment of the present invention. The following diagram presents a method for selecting of one of a plurality of tests based on a given combination rule.

In step 701, the system selects a set of candidate events. The candidate events may be grouped by sensor from which the candidate events originated from, time of candidate events, region associated with the candidate events, etc. In one embodiment, candidate events may be identified by the method described with respect to FIG. 6. A selection of which characteristics to test may is determined based on a given combination rule for the candidate events selected, step 703. In one embodiment, a series of case statements may be used to determine which one of tests to perform in determining whether the candidate events have related locations. Tests for determining neighboring locations are represented by steps 705a, 705b, 705c, and 705d. One of tests 705a-d is selected based on the given combination rule. Specific tests and parameters may be determined by a given combination rule. The locations used to determine related locations may be provided from sub-DMA geolocation, for example as generated by the system described in commonly owned U.S. patent application Ser. No. 13/008,819.

In a "breached valve" scenario, as discussed above, the system determines whether events in the DMAs connected by one or more pipes are kept separate by unmonitored valves which are routinely kept closed in step 705a. The present example describes how the combination rule may use one of several "related location" tests. In a next step 707, the monitoring system marks the candidate events as a set of geographically related events (or as composite events) based on the test of step 705a being satisfied or true. Step 707 is a common step among steps 705a-705d, independent of the DMA breach example, and independent of the choice of step 705a. The method returns to step 701 to select additional candidate events and checks all candidate sets, whether or not any composite events are identified as sets of candidate events are examined.

For other scenarios, the combination rule determines a maximum distance between likely locations of the two events in step 705b, a maximum distance per unit of magnitude of the events in step 705c, or whether the events in the event pair should be located within a same region or sub-network in step 705d. These are examples of possible rules, but a given combination rule may specify others. In step 705b, the maximum distance between likely locations may be predetermined or defined by a network engineer and may be the case for all parameters of the combination rule. For step 705c, the maximum distance per unit of magnitude of the events provides for larger anomalies to be considered adjacent even if they are somewhat further apart. A magnitude of the event may be in terms of a measurable amount of change detected by sensors. For example, a water main burst may significantly decrease the water pressure for pipes connected to the water main for a considerable distance.

In a next step 707 for steps 705b-705d, the monitoring system marks candidate events as a set of geographically related events based on a success of the tests of steps 705b-705d or rejected if the tests of steps 705b-705d are false or not satisfied. Again, step 707 is a common step, independent of the example scenario, and independent of the choice of step 705b-d. In a next step 701, additional candidate events are selected and all candidate sets are checked, whether or not any composite events are identified.

Figure 8:
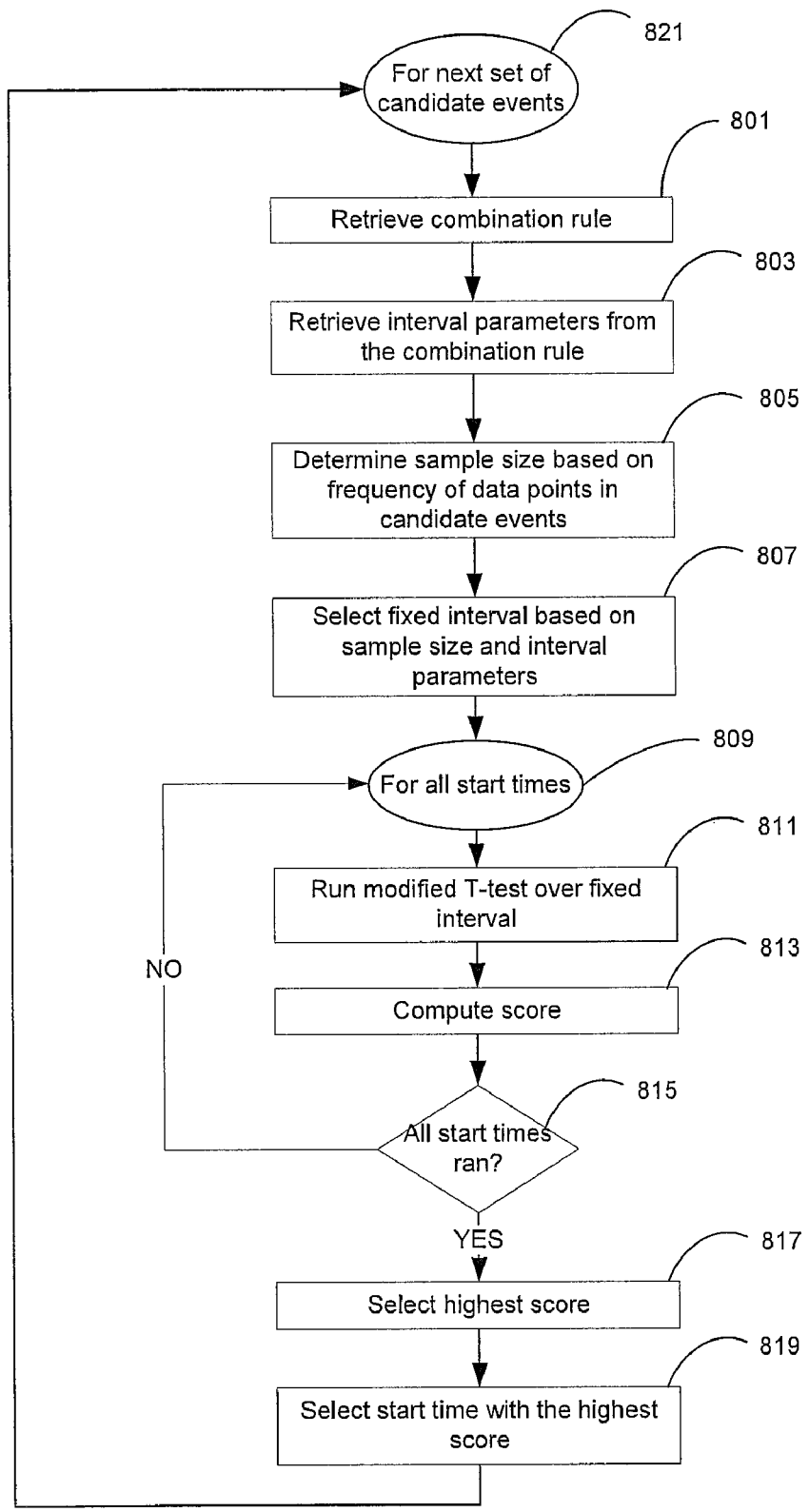
FIG. 8 presents a flow diagram illustrating a method for determining likely start times for candidate events according to an embodiment of the present invention.

FIG. 8 presents a flow diagram illustrating a method for determining a likely start time for a single candidate event according to an embodiment of the present invention.

In step 801, the system retrieves a combination rule for a candidate event. One or more interval parameters are retrieved from the combination rule, step 803. A combination rule may include one or more algorithms or parameters for a specific event type. A combination rule is selected corresponding to the event type selected for the set of candidate events. A sample size is determined based on a frequency of data points in the candidate events, step 805. In a next step 807, a fixed interval is selected based on the sample size and the interval parameters. The system determines a likely start time, where data before that time is significantly different from data after that time. An important characteristic of the start time test, aside from accurate detection of real event starts, is that false positives from the candidate events should generate fairly random start times. In some embodiments, e.g., the breached valve scenario discussed above, measured data must display a distinct increase or a distinct decrease (deviation) at the start time.

The combination rule determines the lengths of a first interval and a second interval, as well as a suspect duration around the candidate event (e.g. 1 day). The variance of the data values in each interval is calculated for all start times. All of the start times are iterated through, step 809. For a given start time, a modified "T-test" is run over the fixed interval, step 811. The system searches for a start time t which best separates the values in a preceding interval of duration x from start time t from the values in a following interval of duration y from start time t. The test iterates through all of times t within the suspect duration. According to one embodiment, this "best separation" time is found by testing the pairs of intervals around all times t, with the following score:

$$|\text{mean}(\text{interval1})/\text{var}(\text{interval1}) - \text{mean}(\text{interval2})/\text{var}(\text{interval2})|$$

taking a start time t with the largest value.

A score is computed according to the modified T-test, step 813. The score is calculated for the change between interval1 (ending at t) and interval2 (starting at t). The system determines whether all the intervals have been run, step 815. If all the intervals have not been run, the system returns to step 809 to test for another start time t. When all the intervals have been run, a highest score is selected in step 817 to determine the most likely start time for the candidate events. A time t is selected which maximizes the score. This start time with the highest score is selected, step 817 and the system proceeds to a next set of candidate events to determine a likely start time, step 821.

The method used to determine start time, for example the method described in the preceding paragraphs, may be such that it always returns a result, the time most likely to be an event start time, if indeed the candidate event describes a real-world anomaly. However, when there was no real event, or when the candidate event did not start abruptly or did not cause a strong signal at the sensor, the data may fail to show one very clear start time. In such cases, the results of the previous stage may be too "noisy" or error-prone to be useful in further testing. In some embodiments, the system will reject individual candidate events (or, in some embodiments, the entire set of candidate events) for which the start time is not a "clear start time."

Figure 9:
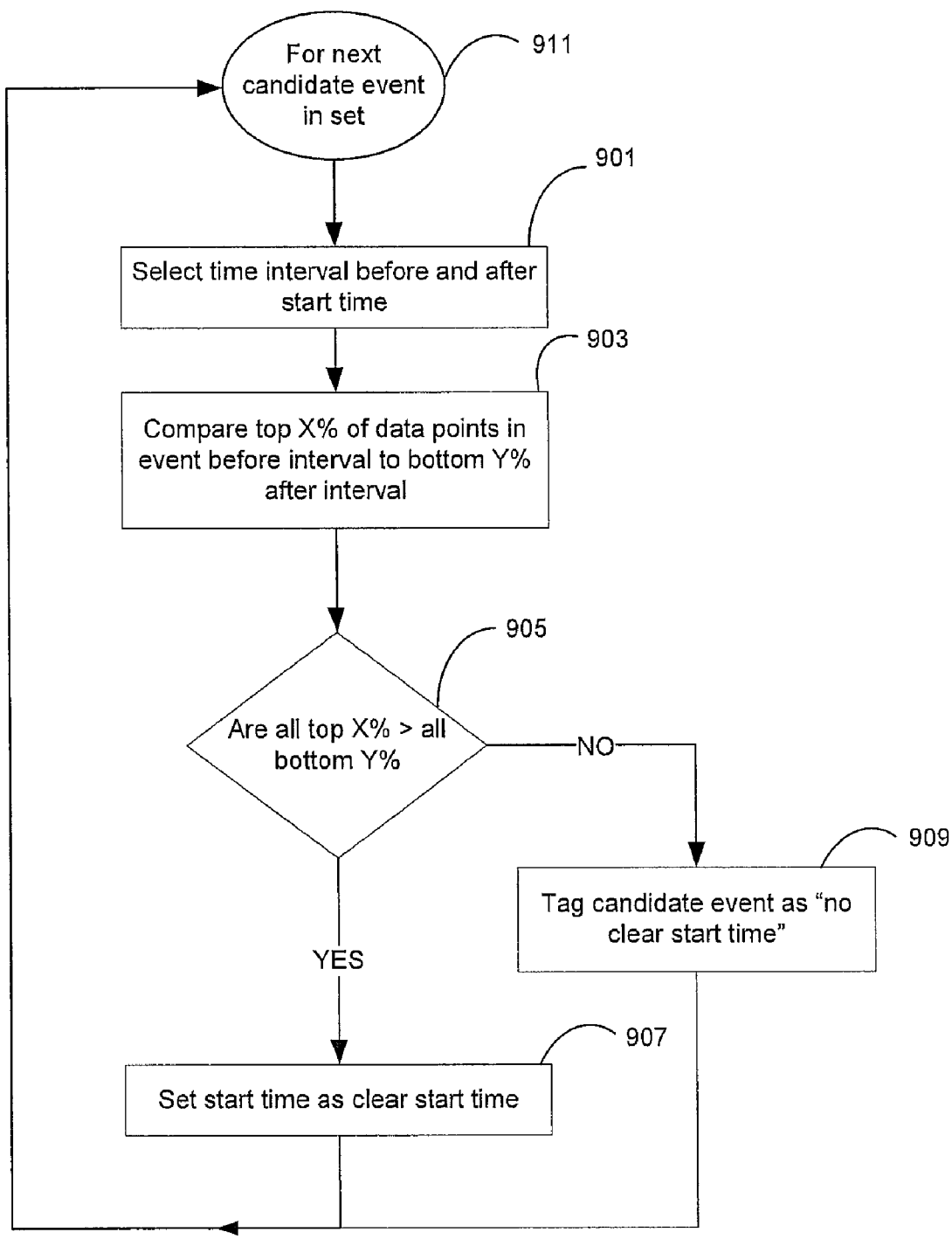
FIG. 9 presents a flow diagram illustrating a method for identifying events with clear start times according to an embodiment of the present invention.

FIG. 9 presents a flow diagram illustrating a method for identifying events with "clear start times" according to an embodiment of the present invention. This may include a generic stage to identify whether there is a marked change at a calculated start time. The following describes an example of a test for "clear start time" of an abrupt increase (or decrease), such as would characterize for instance the candidate events in the breached valve scenario.

In step 901, the system selects time intervals before and after a start time for a candidate event in a set of candidate events determined from, in one embodiment, the steps described in FIG. 6. In one embodiment, the start time of the candidate event may be a likely start time determined by the method described with respect to FIG. 8. The system compares a top X % of data points in the candidate event before the time interval to a bottom Y % after the time interval in step 903. It does this if the candidate event type is a "decrease," and it does the opposite (compares the bottom X % of data points in the candidate event before the time interval to the top Y % after the time interval) if it is an "increase." It is determined whether the entire top X % of data points are greater than all the data points of the bottom Y %, step 905. This ensures that the values shortly before the start time were (with some limited 100−X % exceptions) greater (or smaller) than the values shortly after it (with some limited 100−Y % exceptions). If all of the top X % of data points are not greater than all of the bottom Y %, then the system proceeds to tag the candidate event as "no clear start time," step 909, and continues to a next candidate event in the set. Otherwise, if the determination step 905 is true or satisfied, the start time is set as a clear start time, step 907, and a next candidate event in the set is selected, step 911.

Figure 10:
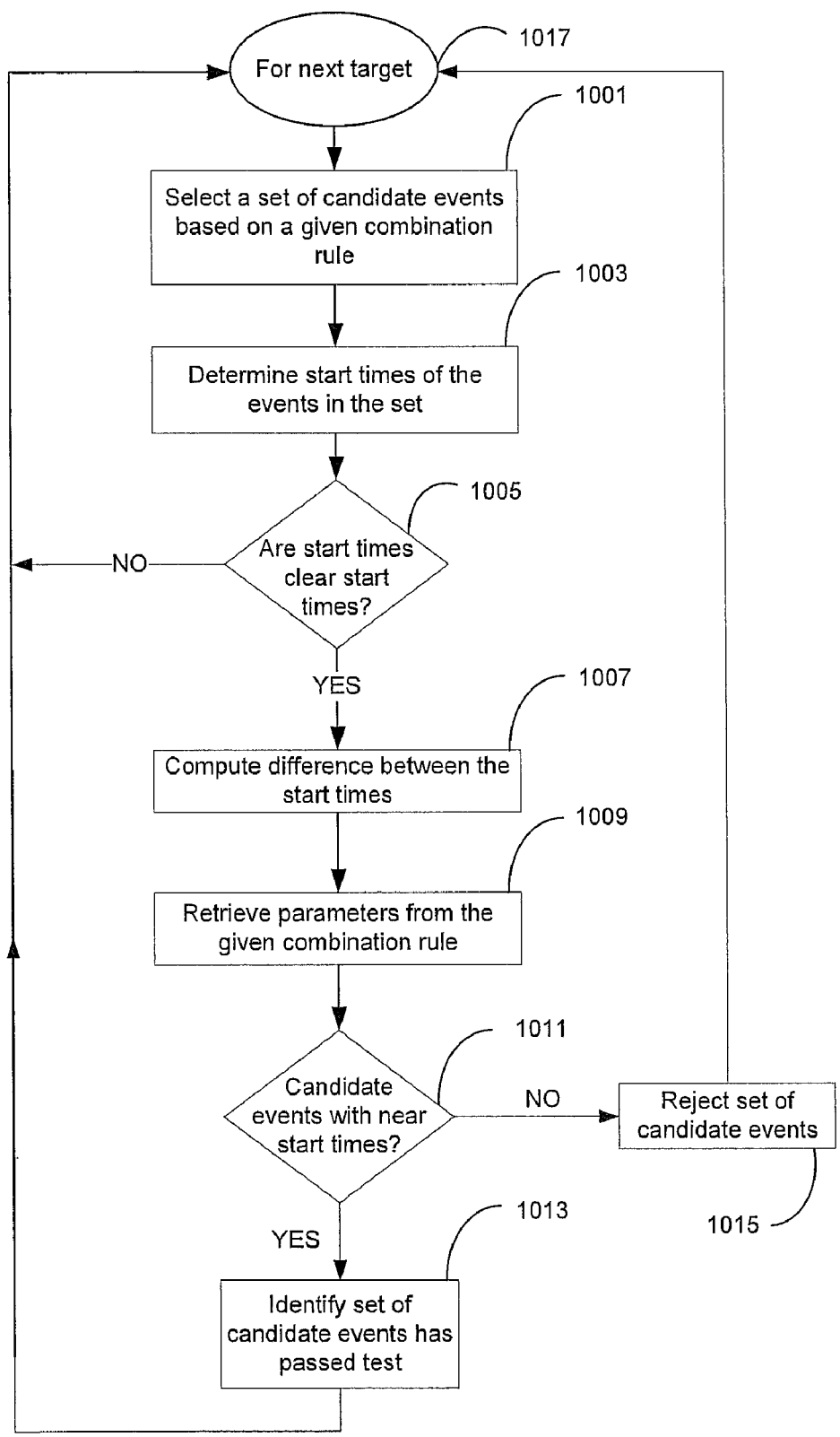
FIG. 10 presents a flow diagram illustrating a method for identifying event pairs with near start times according to an embodiment of the present invention.

FIG. 10 presents a flow diagram illustrating a method for identifying event pairs with near start times according to an embodiment of the present invention. Description of the following method suggests that testing may be sequential, and failing any individual test results in the set of candidate events is ruled out for combining into a composite event. However, sequential testing is one embodiment, and other testing methodologies based on combination rules may be used.

In step 1001, the system selects a set of candidate events based on a given combination rule. The system determines start times of the events in the set in step 1003. The start time may be retrieved or determined by, for example, the steps described in FIG. 8. The system then determines whether the start times are clear start time, step 1005. An exemplary method for determining clear start time is described above with reference to the discussion of FIG. 9. If the start times are not clear start times, the system determines that the test for clear start times has failed and the set of candidate events is rejected, where the system proceeds to step 1013 to analyze a next target (set of candidate events). Otherwise, if the start times are clear start times, the system computes a difference between the start times, step 1007. Related events or anomalies are expected to start simultaneously, or within some short time interval between them, possibly related to distance.

A parameter is retrieved from the given combination rule, step 1009. The system may determine whether the start times are less than a predefined S data samples apart according to the combination rule. In the "breached valve" example, S could represent two hours of data. This may alleviate the likely situation in which additional local transient features are evident in the data, around the start of the main event; for example, a breached valve may appear after some maintenance operations or an extreme hydraulic event, which may generate data which obscures the exact start of the breach. Thus, some inaccuracy in the statistical estimation of the start time may occur, and this parameter should be chosen accordingly. A larger S relative to T (the candidate event duration), may generate more false positives. The false positive rate is 2S/T. Candidate events with near start times are determined based on the retrieved parameters, step 1011. If the start times are closer than the parameters, the candidate set passes the test, step 1013; otherwise, it fails and the set of candidate events is rejected, step 1015. In a next step 1017, the system selects the next set of candidate events to determine more event sets with near start times.

Figure 11:
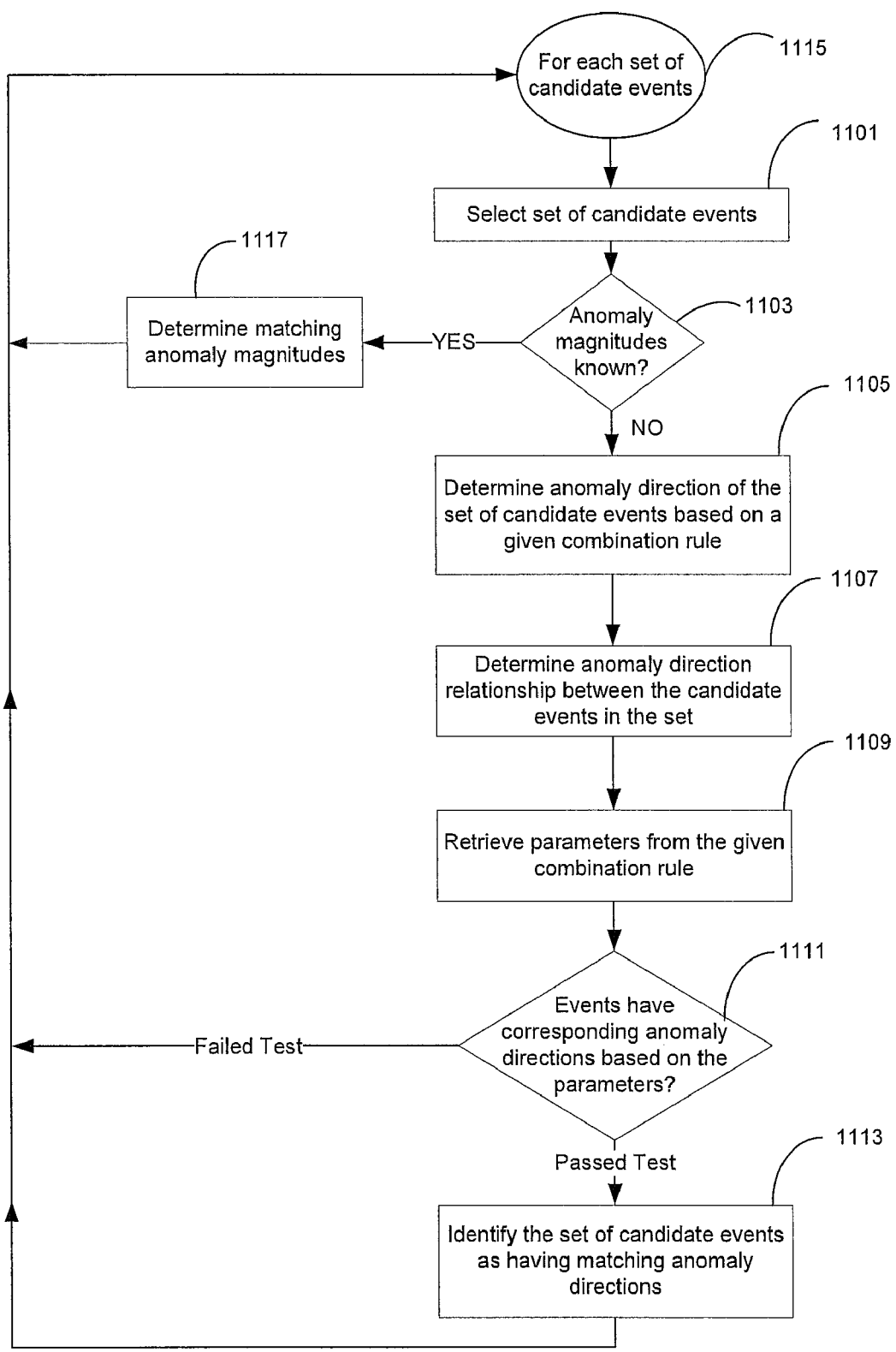
FIG. 11 presents a flow diagram illustrating a method for identifying event pairs with a permitted set of matching anomaly directions according to an embodiment of the present invention.

FIG. 11 presents a flow diagram illustrating a method for identifying event pairs with matching anomaly directions according to an embodiment of the present invention.

A set of candidate events is selected, step 1101. In some embodiments, the system selects only event pairs with anomaly directions of change which match the event type being searched for. The system proceeds to step 1103, where a determination is made of whether anomaly magnitudes of the set of candidate events are known with reasonable accuracy. If they are, a permitted set of matching anomaly magnitudes are determined in step 1117. Matching anomaly magnitudes are described in further detail regarding the methodologies of FIG. 12. The method proceeds from step 1117 to step 1115 to analyze additional sets of candidate events.

In the following discussion, the comparison of directions may be a fallback for when magnitudes cannot be measured precisely enough. In step 1105, anomaly directions of the set of candidate events are determined based on a given combination rule if the anomaly magnitudes are not known from step 1103. Anomaly direction relationships are determined between the candidate events in the set, step 1107.

Parameters are retrieved from the given combination rule, step 1109. The combination rule determines the individual tests and parameters to run for a given event scenario. In a next step 1111, a determination is made whether the events have corresponding anomaly directions based on the retrieved parameters. That is, the system checks for a permitted set of anomaly directions between the candidate events (i.e., a test). The combination rule determines which sets of anomaly directions are permitted. For example, when searching for related pressure increases or decreases, the system may require that related events all have the same direction (all increasing or all decreasing). In the breached valve scenario, the system may select only pairs of events in which one event is a flow increase, while the other event is a flow decrease. If not, the set of candidate events is identified as not having matching anomaly directions (failing the test) and the system proceeds to step 1115 to select a next set of candidate events to analyze. Otherwise, the system identifies that the candidate events in the set have matching anomaly directions (passing the test) in step 1113. Next, in step 1115, the system selects the next set of candidate events.

One of skill in the art will recognize that if a combination rule specifies combination of candidate events of different types (such as pressure and flow), the permitted directions may be dependent upon the event type. For example, a combination rule may combine a flow increase with one or more pressure decreases, indicative of a leak.

Figure 12:
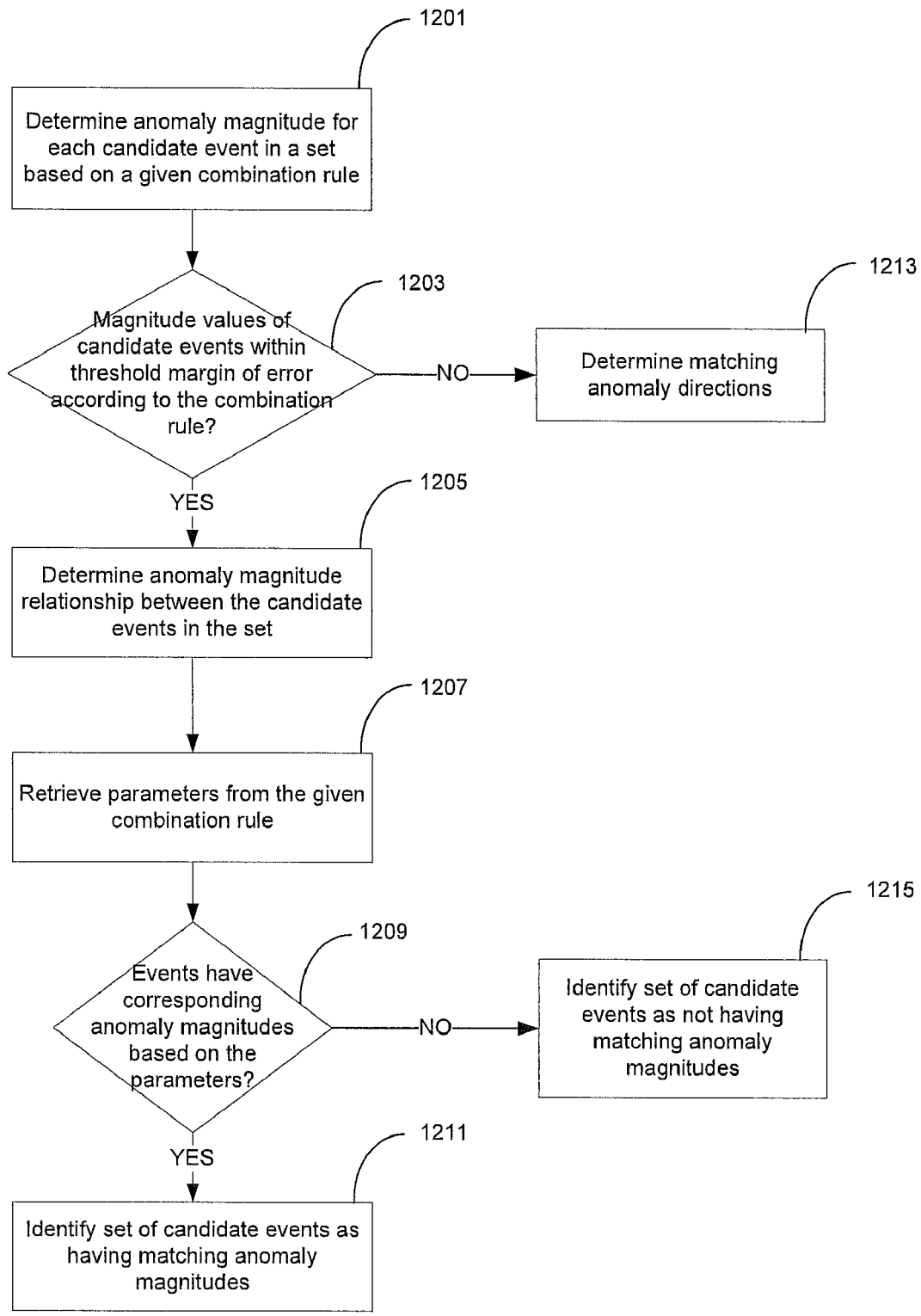
FIG. 12 presents a flow diagram illustrating a method for identifying event pairs with a permitted set of matching anomaly magnitudes according to an embodiment of the present invention.

FIG. 12 presents a flow diagram illustrating a method for identifying event pairs with matching anomaly magnitudes according to an embodiment of the present invention.

Anomaly magnitudes for each candidate event in a set are retrieved from event information, step 1201. In a next step 1203, a determination is made whether magnitude values of the candidate events are known with sufficient accuracy, according to the given combination rule (for example, whether the margin of error is small enough compared to the set of magnitudes, to be able to determine whether or not the magnitudes form a "permitted set"). If not, the system proceeds onto step 1213 and determines matching anomaly directions using methods such as the one described regarding FIG. 11. Otherwise, if the candidates are within the margin of error, an anomaly magnitude relationship is determined between the candidate events in the set, step 1205. If the magnitude of anomaly of the component events may be reliably measured, the system selects only sets of candidate events with matching magnitudes, as determined by the event type being searched for. For example, when searching for pressure increases or decreases, the system may require that related events have relatively similar pressure changes. In some combination rules, the system may select sets of events for which the magnitudes of flow anomalies sum approximately to zero (to within some percentage or absolute tolerance). For example, the sum of a flow increase through one pipe and a similar decrease in flow through another pipe would result in a sum of zero.

Parameters are retrieved, which are determined by the combination rule, step 1207. In a next step 1209, a determination is made whether the events have corresponding anomaly magnitudes based on the retrieved parameters. The determination is made based on the retrieved parameters from the event type rule. The candidate events are determined to either have corresponding anomaly magnitudes or not. If the candidate events have corresponding magnitudes, the set of candidate events is identified as having matching anomaly magnitudes, step 1211. Otherwise, the set of candidate events is identified as not having matching anomaly magnitudes, step 1215.

FIGS. 1 through 12 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

It should also be understood that the invention applies not only to water utility networks, but to any type of distribution system. Other types of distribution systems may be: oil, wastewater or sewage, gas, electric, telephony, heating ventilating and air conditioning ("HVAC" systems), or other energy delivery systems which involve fluid or flowing resources from one area to consumers. Indeed, the invention may be applied to any distribution or collection system having meters or sensors at arbitrary locations in the network measuring distribution parameters such as flow, pressure, quality or the flow of data itself.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method performed using a processor for identifying related events in a water network monitoring system, the events represented by stored event data derived from data received from one or more sources including sensor data received from a plurality of sensors in the water network, each event data comprising data identifying an event and one or more characteristics of the event, the method comprising:
    retrieving event data from an event database, the event data representing a plurality of events which have been processed from anomalies received from the water network monitoring system and which each contain a plurality of data fields including event start time and event magnitude;
    identifying at least two events from the event data as being candidate events that are likely to constitute parts of a composite event, the identified candidate events each being determined by the water network monitoring system not to be statistically significant enough to be reported as events by themselves;
    selecting an event combination rule, the event combination rule including one or more tests to determine whether the candidate events are related and can be combined to form a composite event of a given event type;
    comparing one or more event characteristics between the at least two candidate events based on the event combination rule;
    determining, based at least in part on the comparison, that at least two candidate events are related to one another and are processible as a single event of the given event type; and
    reporting the determination of the at least two candidate events as being related and as the single event of the given event type to a user via a user interface.

2. The method of claim 1 wherein the one or more event characteristics include at least one of flow rate, pressure, reservoir level, turbidity, chlorine level, and pH.

3. The method of claim 1 comprising detecting a continued or frequent occurrence of an anomaly from which an event is derived over multiple time periods.

4. The method of claim 3 wherein the one or more tests includes a test for determining anomalies to be significant based on the detected continued or frequent occurrence.

5. The method of claim 1 further comprising associating a score with the anomaly, indicating the probability of such an anomaly occurring randomly, without any unusual event in the system being monitored.

6. The method of claim 1, wherein determining the at least two candidate events are related and associated with a composite event comprises determining a related location corresponding to the at least two candidate events.

7. The method of claim 1 further comprising determining a start time of the at least two candidate events.

8. The method of claim 7 wherein determining a start time of the at least two candidate events comprises determining a distinct deviation between a sensor's data before the start time and the sensor's data after the start time.

9. The method of claim 8 wherein determining a start time of each of the at least two candidate events comprises:
calculating a score for a pair of intervals around each of a plurality of possible start times based on the formula: |mean(interval1)/var(interval1)−mean(interval2)/var(interval2)|; and
finding a start time which maximizes the score calculated for the pair of intervals around each possible start time based on the formula.

10. The method of claim 8 further comprising determining a clear start time including:
comparing whether a first percentage of the data in a first interval before a start time is greater or smaller than a second percentage of the data in a second interval after the start time.

11. The method of claim 10 wherein the first and second percentages are 100%.

12. The method of claim 7 wherein determining the at least two candidate events are related and associated with a composite event comprises determining the at least two candidate events having near start times.

13. The method of claim 12 wherein determining the at least two candidate events having near start times comprises determining an amount of data samples between the at least two candidate events based on parameters from the event combination rule.

14. The method of claim 1 wherein determining the at least two candidate events are related and associated with a composite event comprises determining the at least two candidate events having matching anomaly directions.

15. The method of claim 14 wherein matching anomaly directions includes the at least two candidate events associated with measurement increases.

16. The method of claim 14 wherein matching anomaly directions includes the at least two candidate events associated with measurement decreases.

17. The method of claim 14 wherein matching anomaly directions includes one of exactly two candidates associated with a measurement increase and the other associated with a measurement decrease.

18. The method of claim 1 wherein determining the at least two candidate events are related and associated with a composite event comprises determining the at least two candidate events having matching anomaly magnitudes.

19. The method of claim 18 wherein matching anomaly magnitudes includes the at least two candidate events associated with measurement increases of at least substantially similar magnitude.

20. The method of claim 18 wherein matching anomaly magnitudes includes the at least two candidate events associated with measurement decreases of at least substantially similar magnitude.

21. The method of claim 18 wherein matching anomaly magnitudes includes the at least two candidate events being associated with measurement increases and decreases which sum to approximately zero.

22. The method of claim 1 wherein the composite events of the given event type is one of at least DMA breach, leak, burst, and pressure drop.

23. A computerized method performed using a processor for identifying related events in a network monitoring system, the events being derived from anomalies detected as occurring in the network being monitored, each event data comprising data identifying a type of event and one or more characteristics of the event, the method comprising:
retrieving event data from an event database, the event data representing a plurality of events which have been processed from anomalies received from the network monitoring system and which each contain a plurality of data fields including event start time and event magnitude;
retrieving a first event combination rule from a stored collection of event combination rules, the event combination rules each comprising one or more parameters for identifying candidate events that are likely to constitute parts of a composite event and one or more tests to determine whether the candidate events are related and can be combined to form a composite event of a given event type, wherein the identified candidate events are determined by the network monitoring system not to be statistically significant enough to be reported as events by themselves, the one or more tests including a first test for determining whether two or more candidate events occurred at related locations in the network, a second test for determining whether two or more candidate events occurred at near start times to one another, and a third rule for determining a permitted set of magnitudes or directions for the anomalies from which the candidate events were determined;
applying the first event combination rule to identify at least two events from the event data as being candidate events;
comparing one or more event characteristics between the at least two candidate events based on one or more of the tests included in the first event combination rule;
determining, based at least in part on the comparison, that at least two candidate events are related to one another and are processible as a single event of the given event type; and
reporting the composite event as the single event of the given event type to a user via a user interface.

24. The method of claim 23 wherein the second test for determining near start times of the at least two candidate events includes one or more parameters for identifying possible start times for the at least two candidate events, determining for each candidate event whether the most likely start time is a clear anomaly start time, and determining a difference between the clear start times for the candidate events.

25. The method of claim 23, wherein the first event combination rule includes one or more parameters for selecting an anomaly detector in the network management system, and wherein applying the first event combination rule to identify two or more candidate events comprises selecting the anomaly detector to be used to detect the anomalies from which the candidate events are determined, and generating the candidate events.

26. The method of claim 25, wherein the first event combination rule includes one or more parameters for selecting events as candidate events, and wherein applying the first event combination rule to identify two or more candidate events comprises selecting the candidate events from a set of events stored in an event database.

27. The method of claim 23, wherein the network is a water delivery network.

28. The method of claim 23, wherein comparing one or more event characteristics between the at least two candidate events comprises comparing the characteristics based on all the tests included in the first event combination rule.

29. A computerized method performed using a processor for identifying related events in a water network monitoring system, the events represented by stored event data derived from data received from one or more sources including sensor data received from a plurality of sensors in the water network, each event data comprising data identifying an event and one or more characteristics of the event, the method comprising:

retrieving event data from an event database, the event data representing a plurality of events which have been processed from anomalies received from the water network monitoring system and which each contain a plurality of data fields including event start time and event magnitude;

selecting an event combination rule, the combination rule including one or more tests to determine whether the plurality of events are related and can be combined to form a composite event of a given event type, the candidate events determined by the water network monitoring system not to be statistically significant enough to be reported as events by themselves;

generating a plurality of candidate events based on the event combination rule;

identifying, based at least in part on the comparison, a subset of the candidate events are related to one another and are processible as a single event of the given event type; and reporting the identification of the subset of candidate events as being related and as the single event of the given event type to a user via a user interface.

30. A system for identifying related events in a water network monitoring system, the system comprising:

one or more sensors in the water network;

an event data store storing a plurality of event data derived from data received from the one or more sensors, the plurality of event data representing a plurality of events which have been processed from anomalies received from the water network monitoring system and which each contain a plurality of data fields including event start time and event magnitude; and a composite event subsystem operative to:

retrieve the plurality of event data from the event data store;

identify at least two events from the plurality of event data as candidate events likely to constitute parts of a composite event, the candidate events determined by the water network monitoring system not to be statistically significant enough to be reported as events by themselves;

select an event combination rule, the combination rule including parameters for generating candidate events and one or more tests to determine whether the candidate events are related and can be combined to form a composite event of a given event type;

compare one or more event characteristics between the at least two candidate events based on the event combination rule;

determine, based at least in part on the comparison, that at least two candidate events are related to one another and are processible as a single event of the given event type; and report the determination of the at least two candidate events as being related and as the single event of the given event type to a user via a user interface.

* * * * *